J. H. DEAN.
VOTING MACHINE.
APPLICATION FILED DEC. 27, 1904.
1,013,646.
Patented Jan. 2, 1912.
19 SHEETS—SHEET 4.
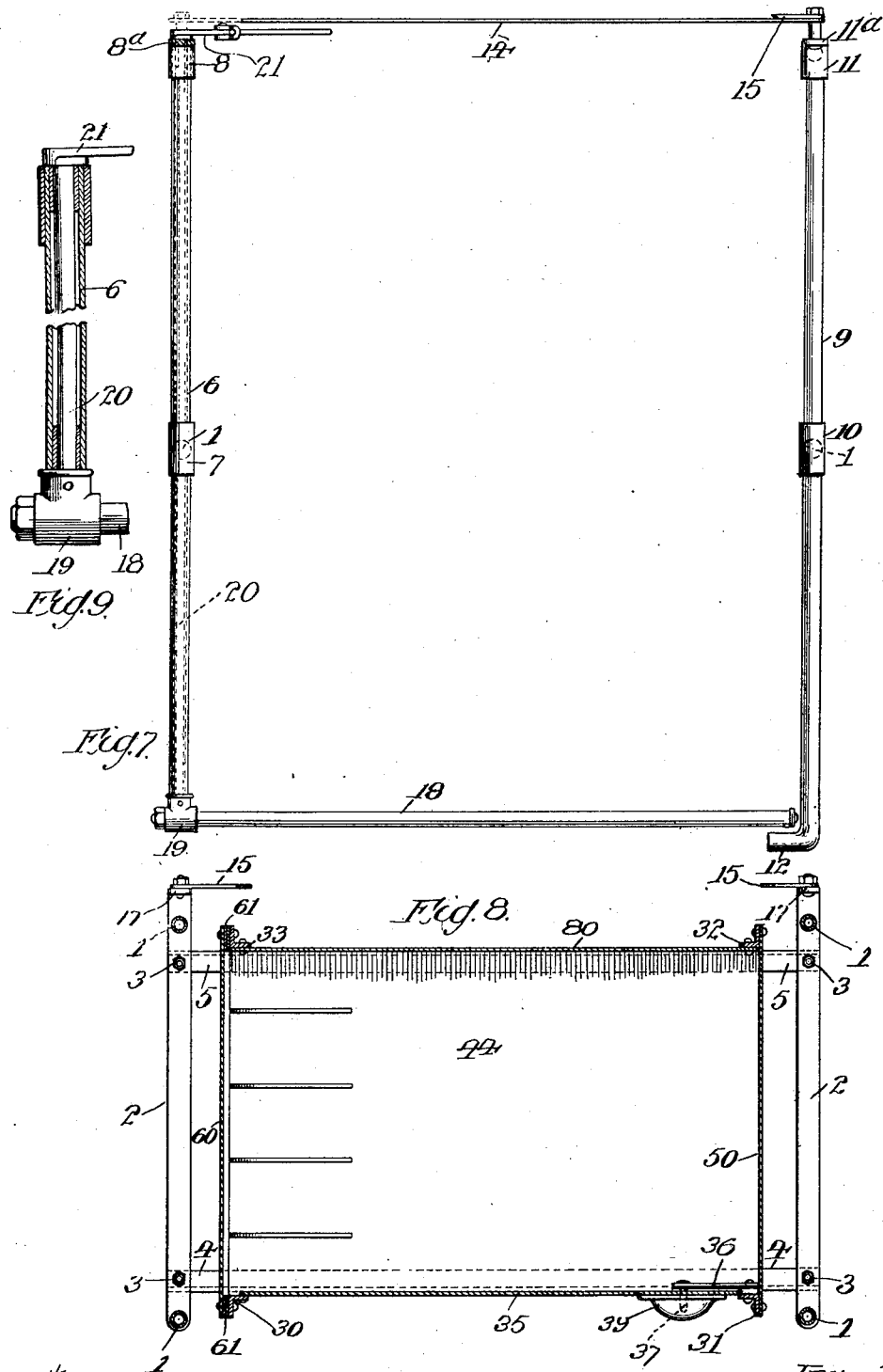

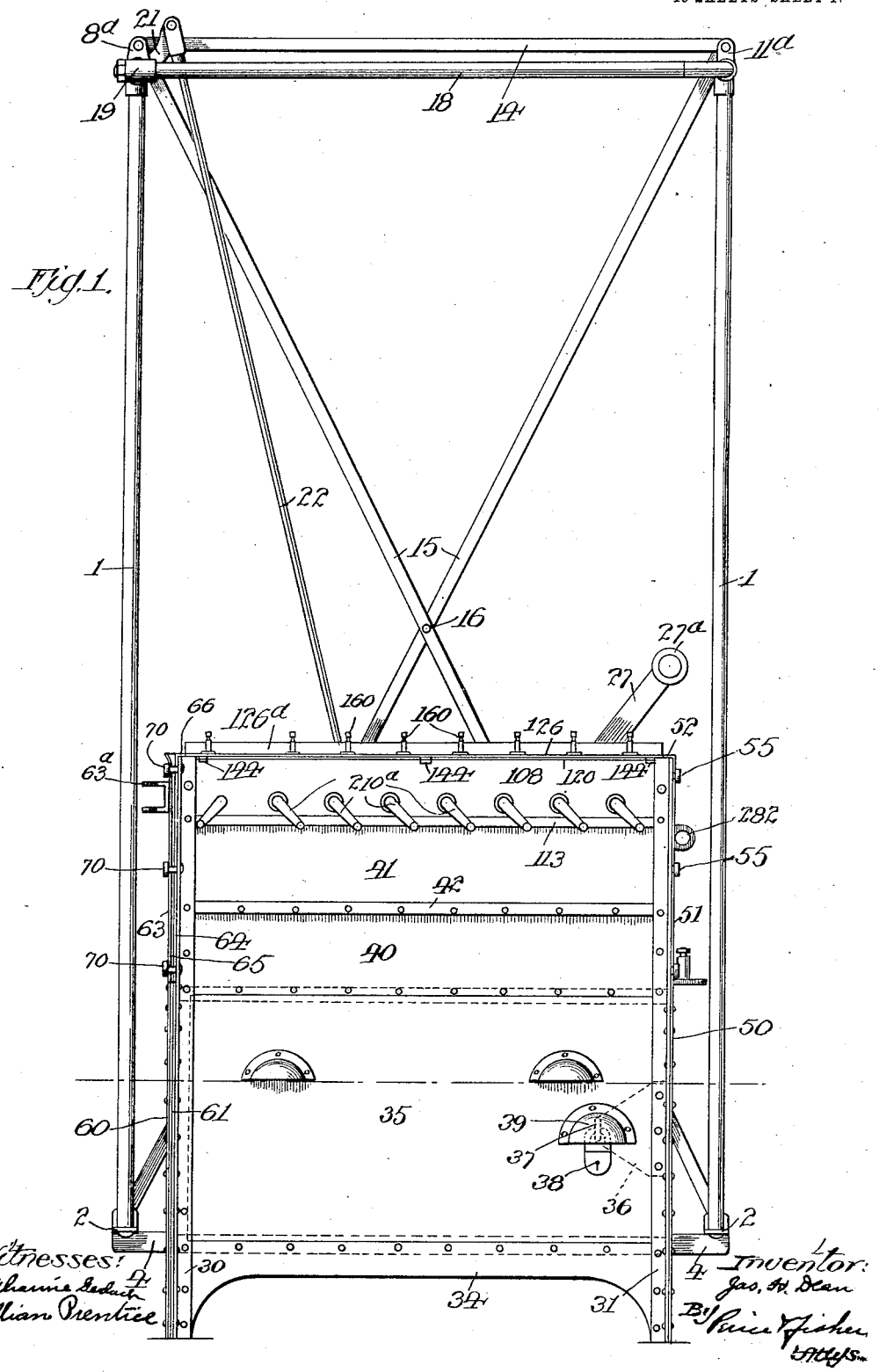

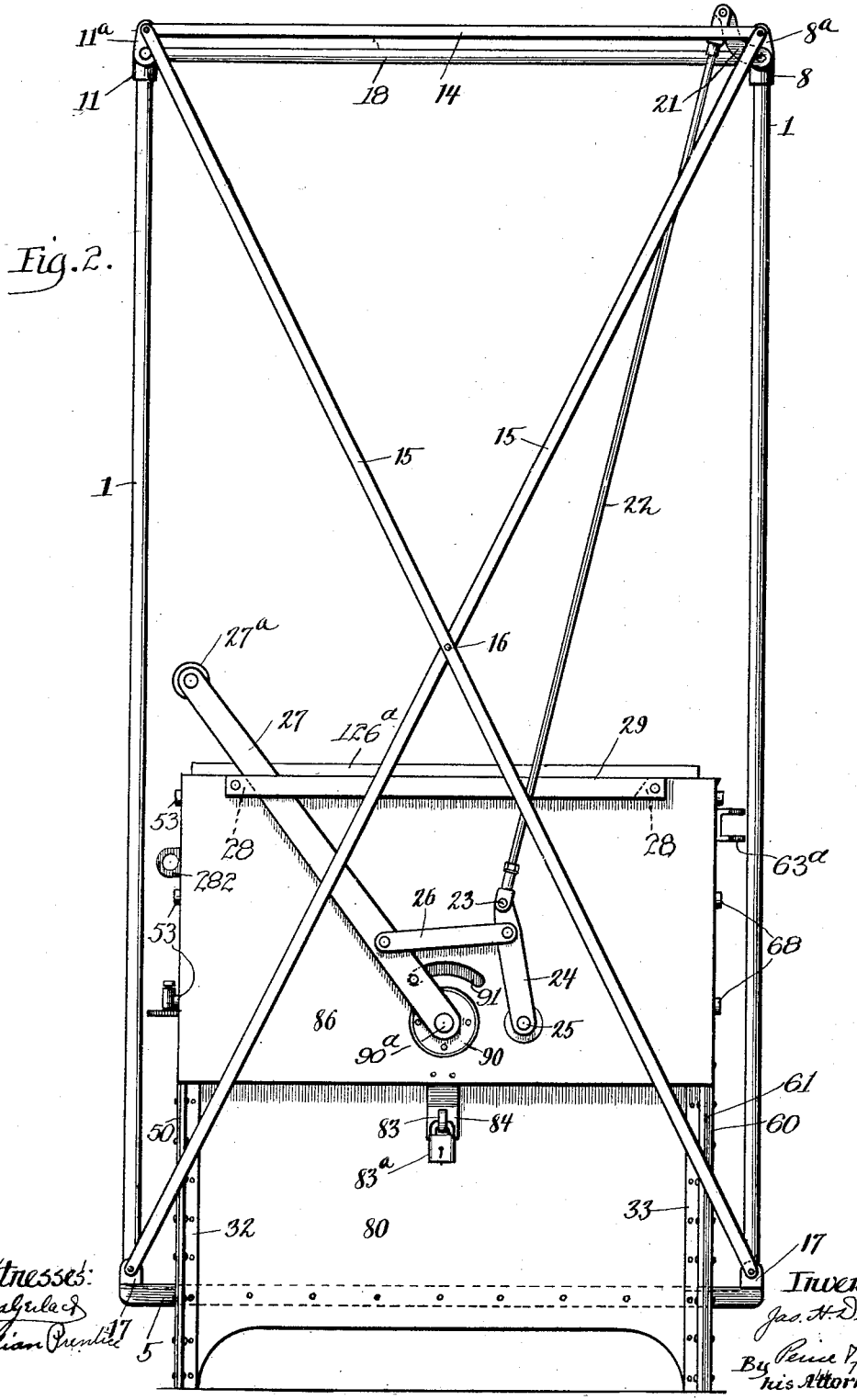

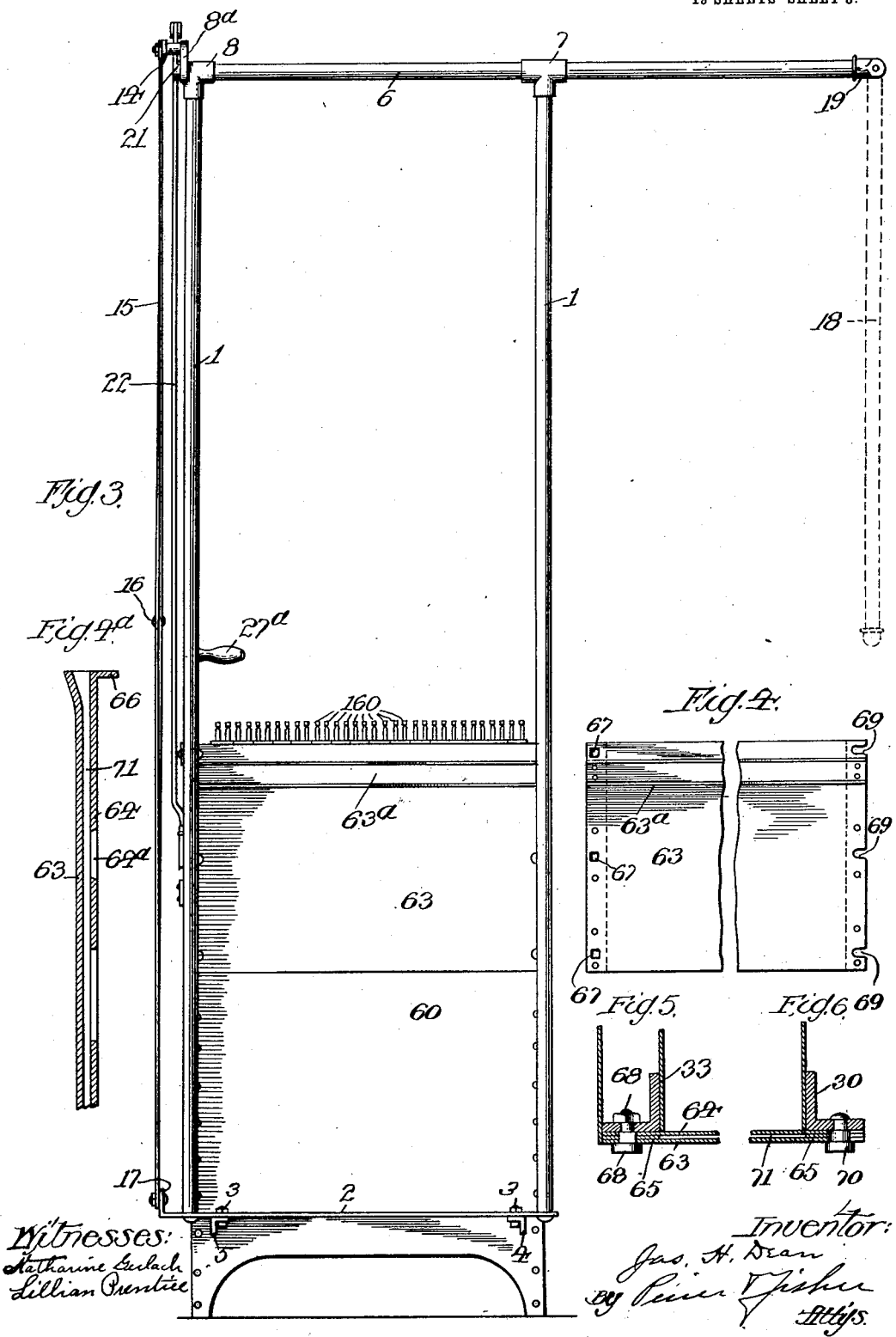

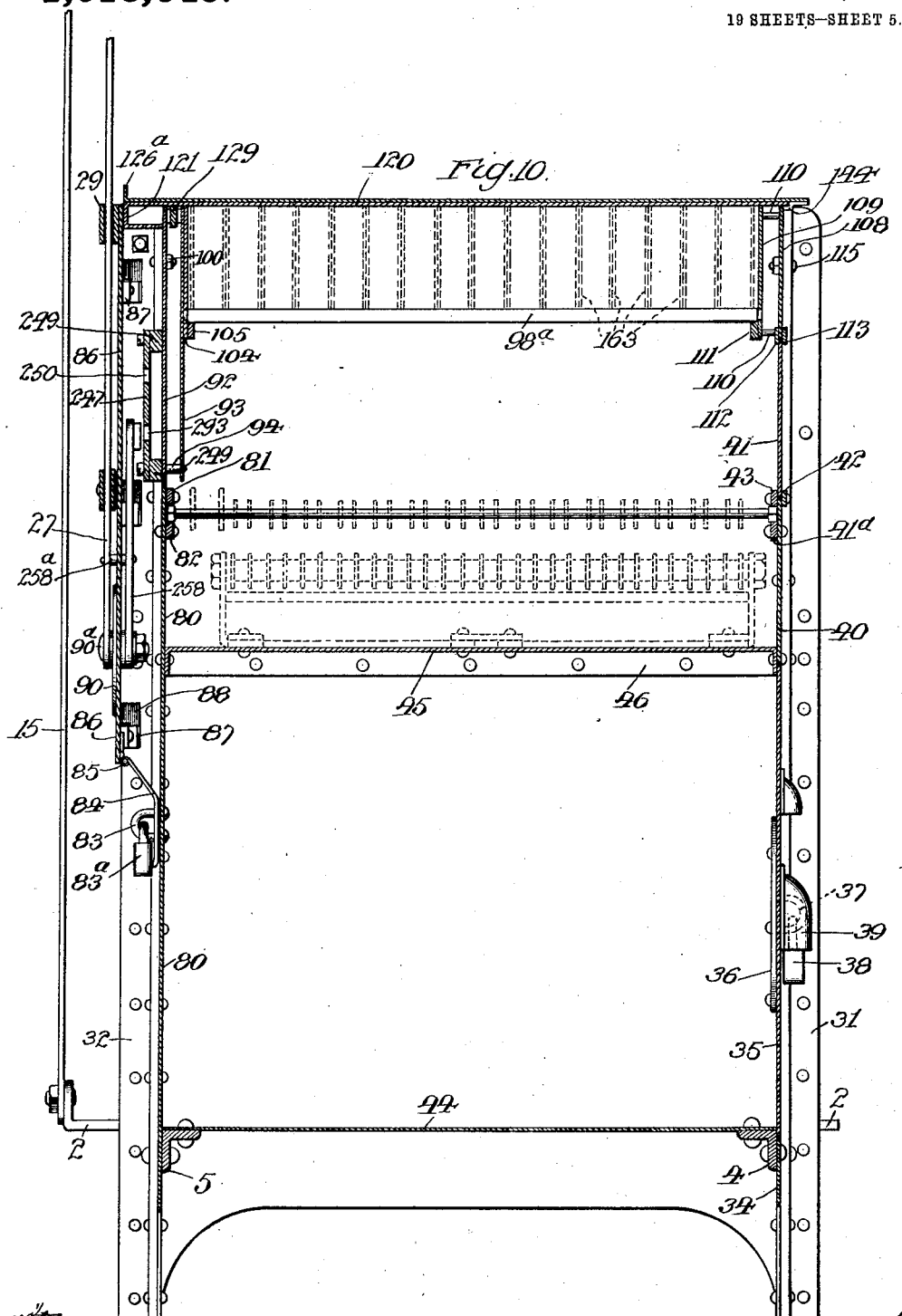

J. H. DEAN.
VOTING MACHINE.
APPLICATION FILED DEC. 27, 1904.
1,013,646.
Patented Jan. 2, 1912.
19 SHEETS—SHEET 6.
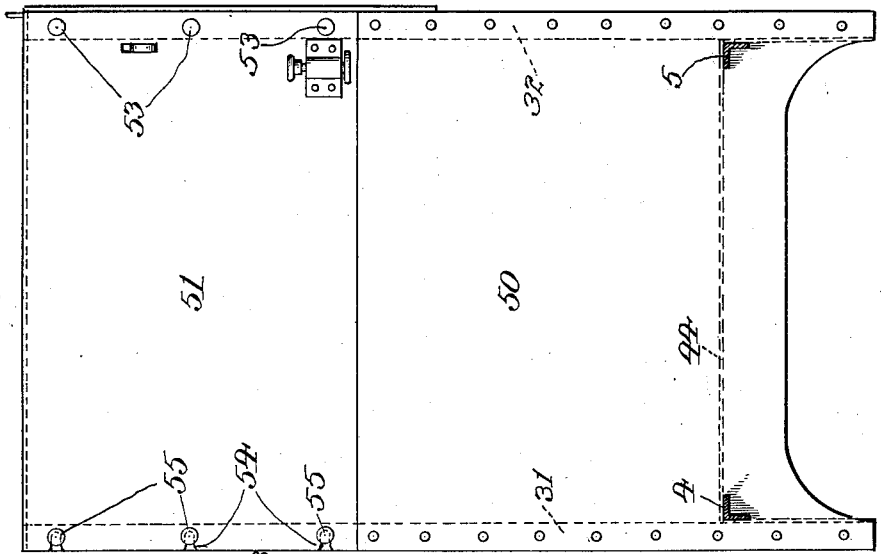
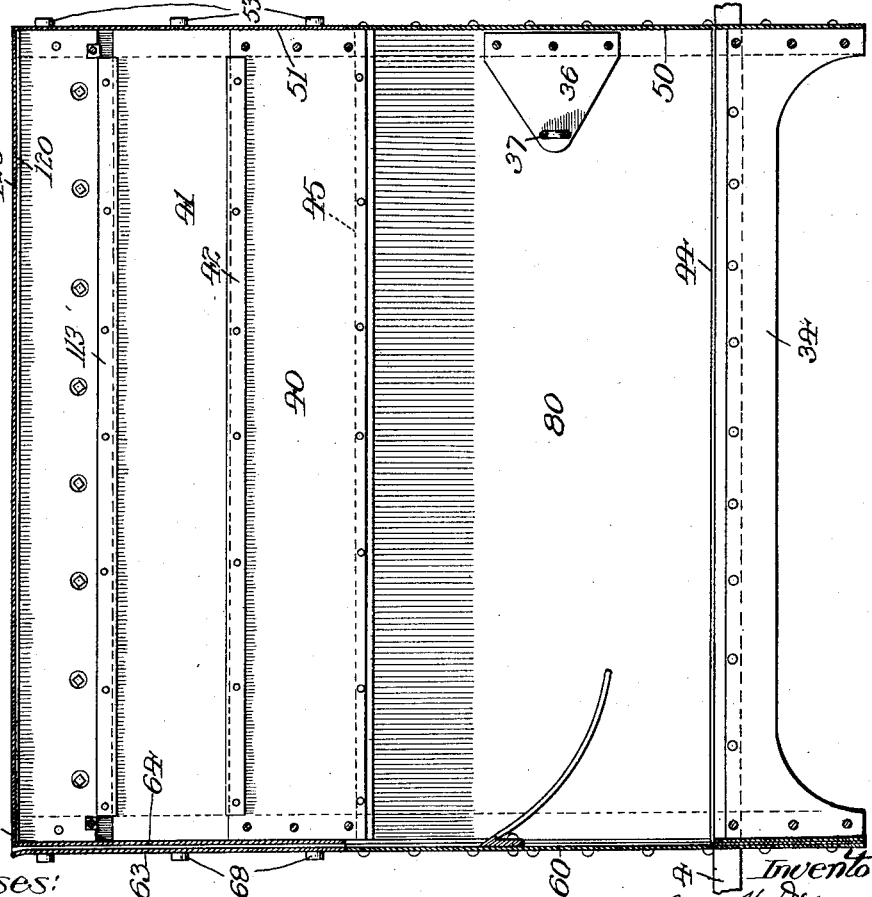

J. H. DEAN.
VOTING MACHINE.
APPLICATION FILED DEC. 27, 1904.
1,013,646.
Patented Jan. 2, 1912.
19 SHEETS—SHEET 8.
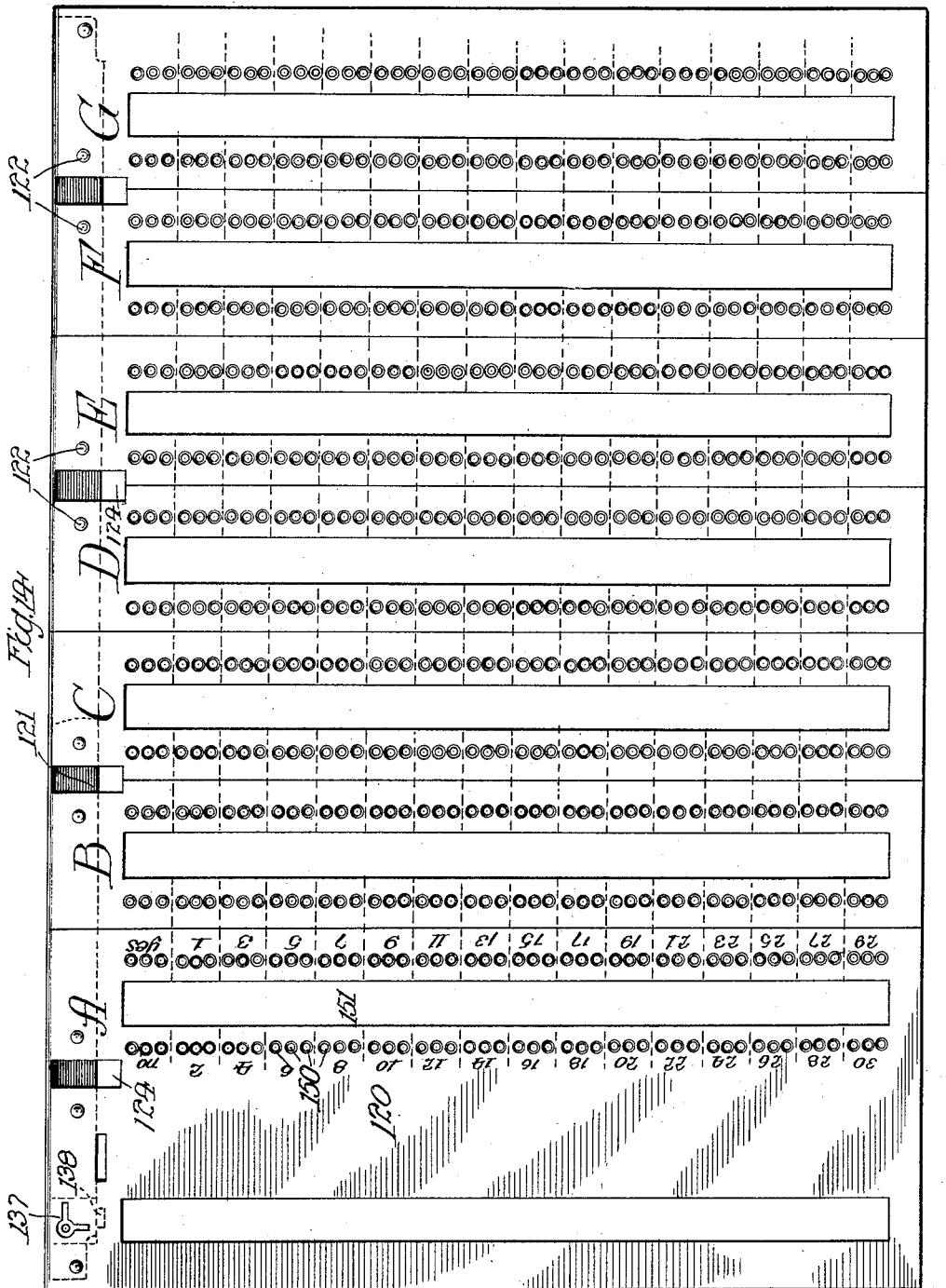

J. H. DEAN.
VOTING MACHINE.
APPLICATION FILED DEC. 27, 1904.
1,013,646.
Patented Jan. 2, 1912.
19 SHEETS—SHEET 9.
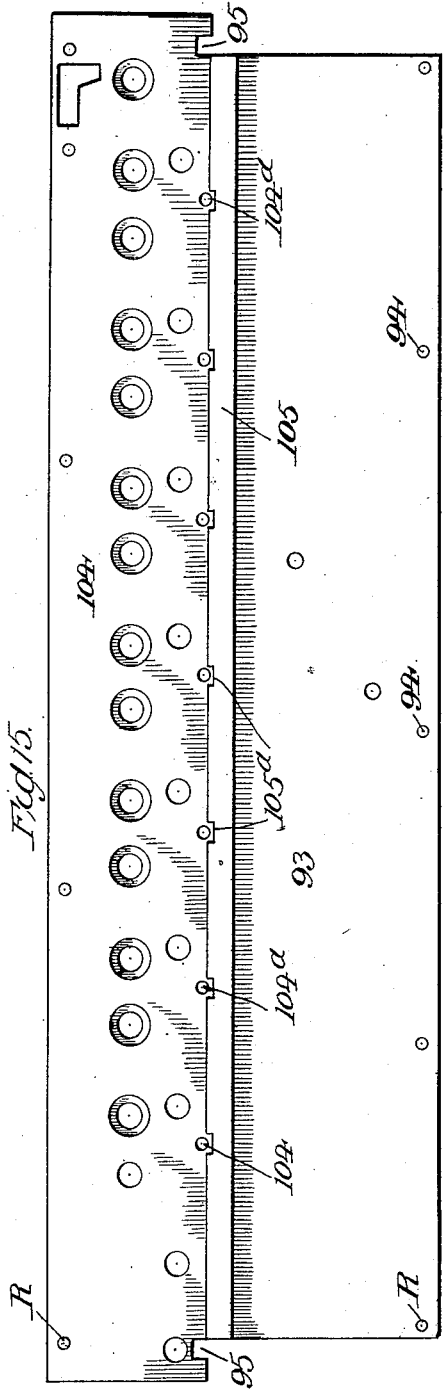
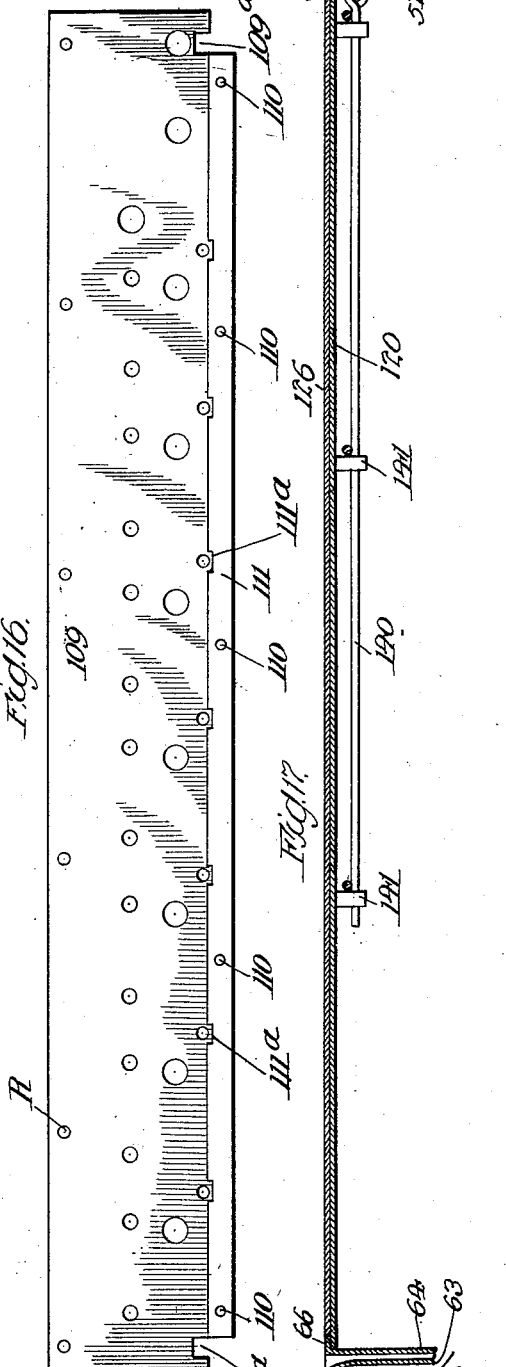

J. H. DEAN.
VOTING MACHINE.
APPLICATION FILED DEC. 27, 1904.
1,013,646.
Patented Jan. 2, 1912.
19 SHEETS—SHEET 10.
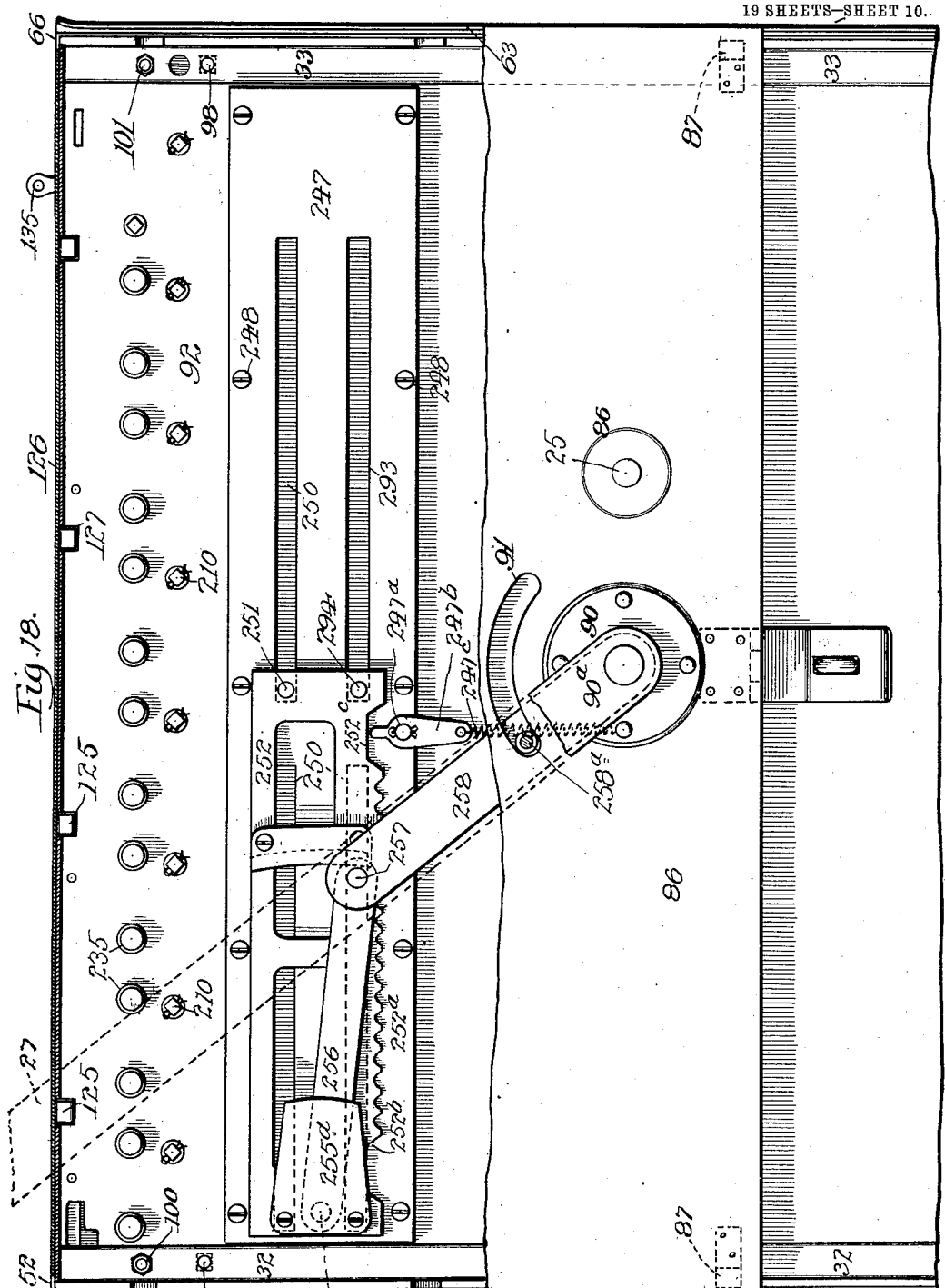

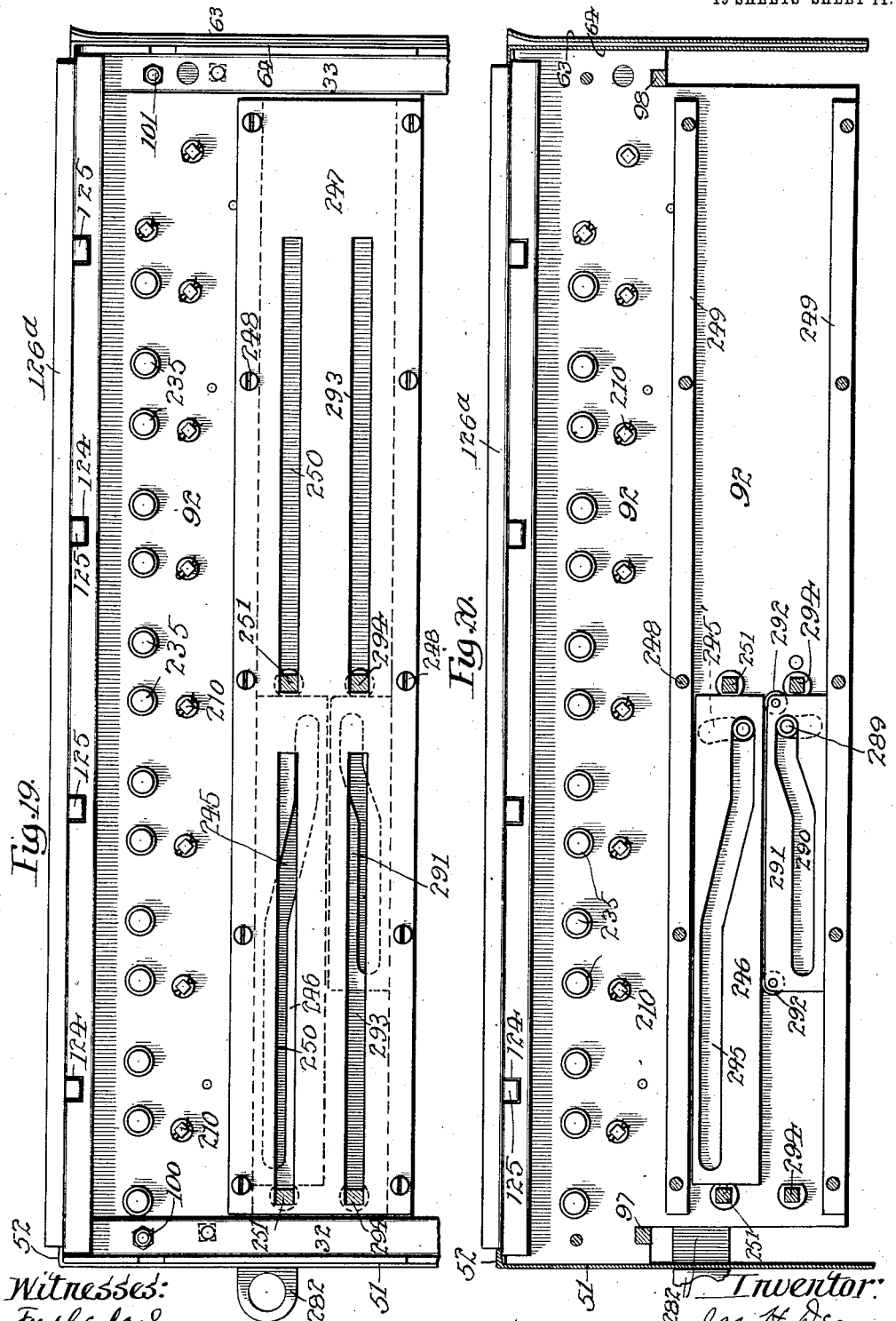

J. H. DEAN.
VOTING MACHINE.
APPLICATION FILED DEC. 27, 1904.
1,013,646.
Patented Jan. 2, 1912.
19 SHEETS—SHEET 12.
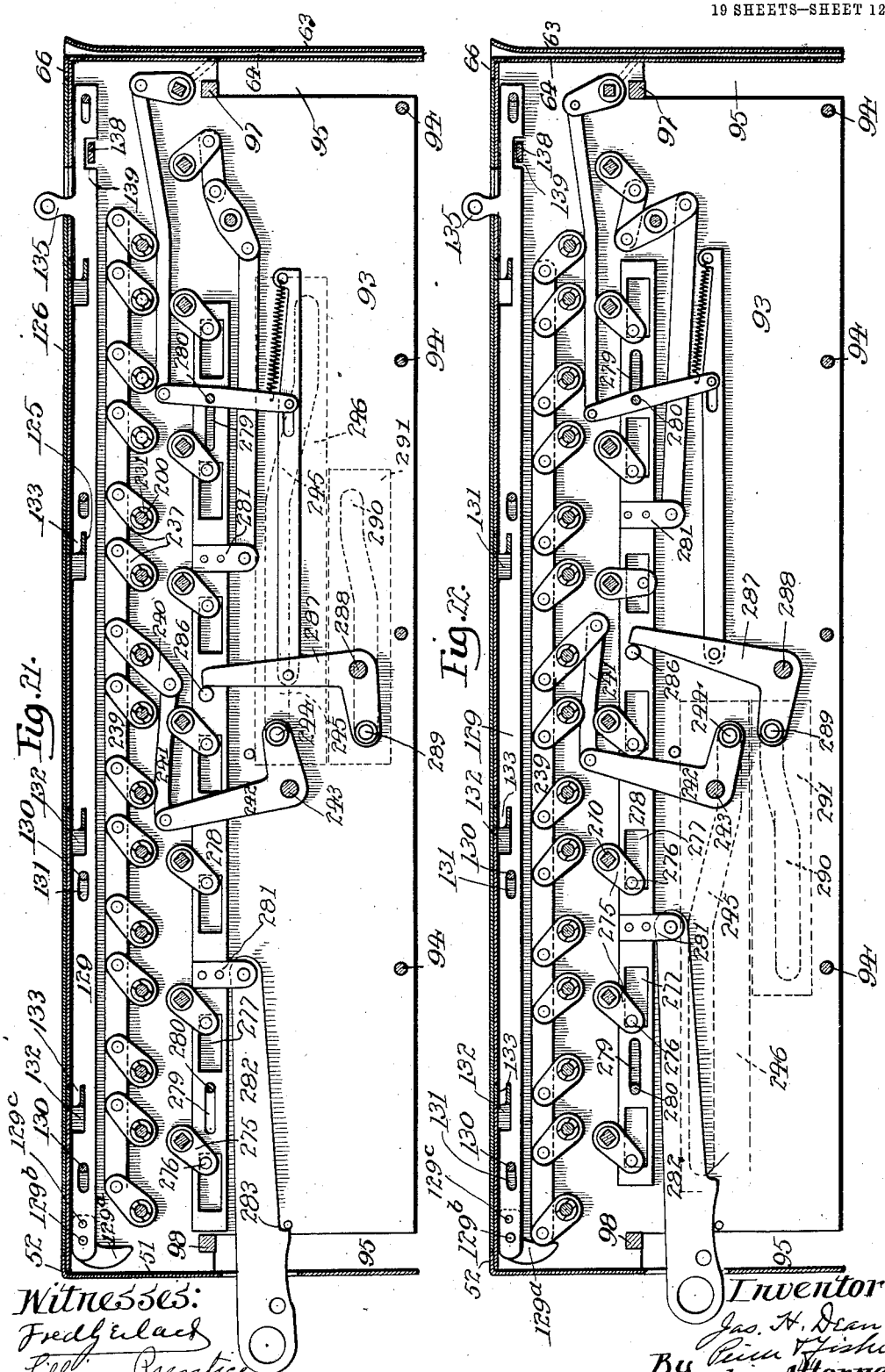

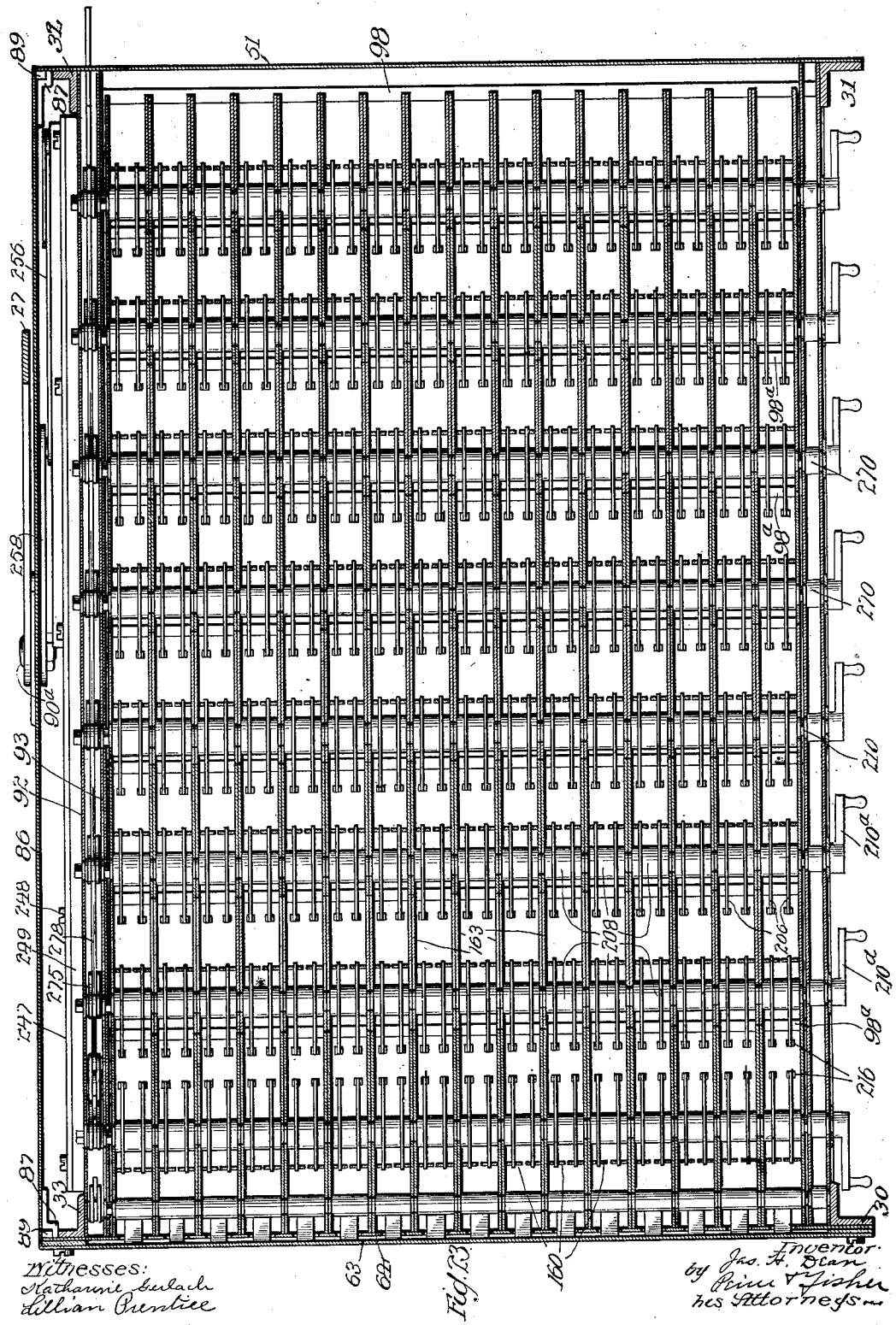

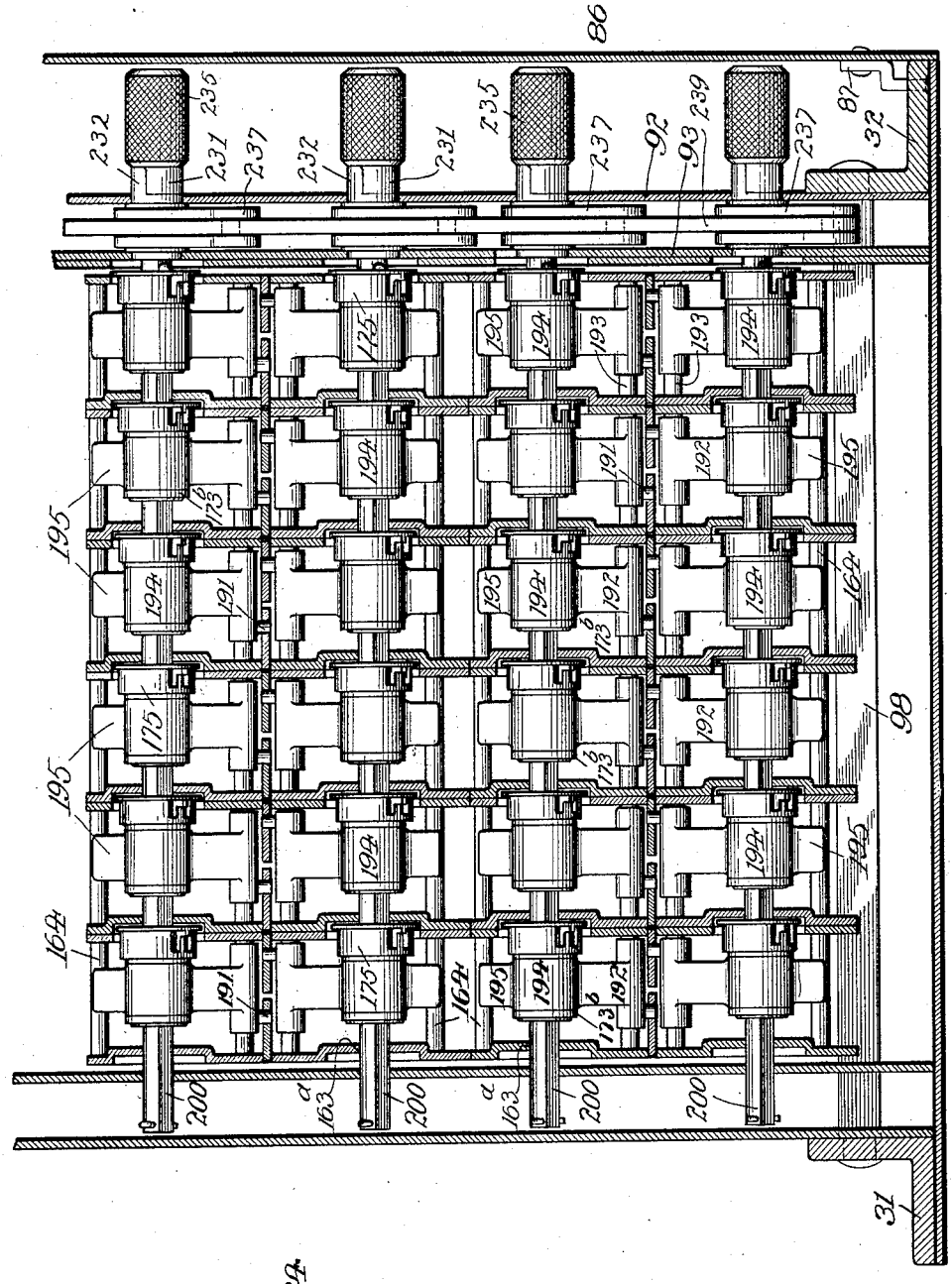

J. H. DEAN.
VOTING MACHINE.
APPLICATION FILED DEC. 27, 1904.

1,013,646.

Patented Jan. 2, 1912.
19 SHEETS—SHEET 15.

Witnesses:
Fred Gerlach
Lillian Prentice

Inventor:
Jas. H. Dean.
By Penn & Fisher
his Attorneys.

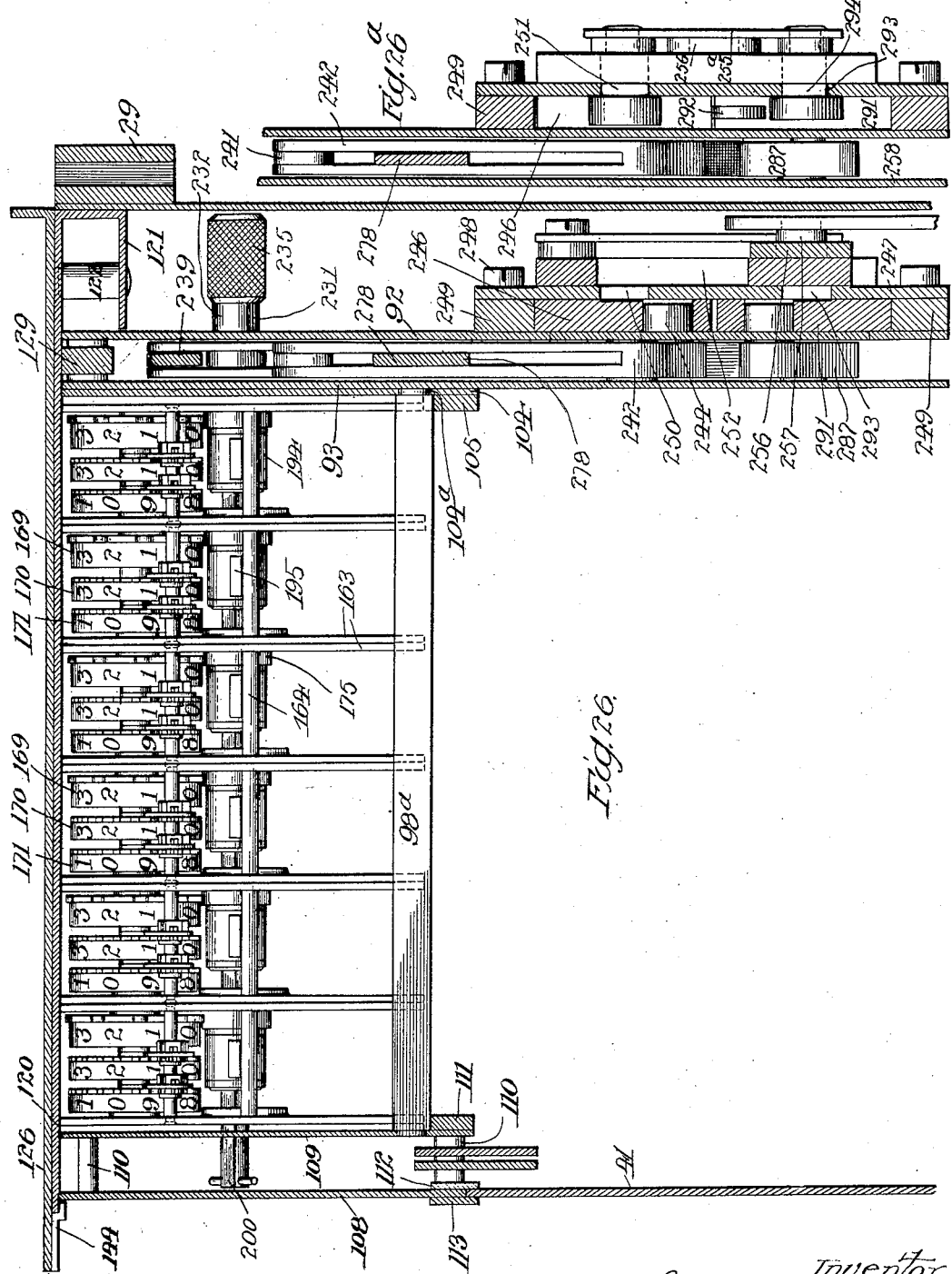

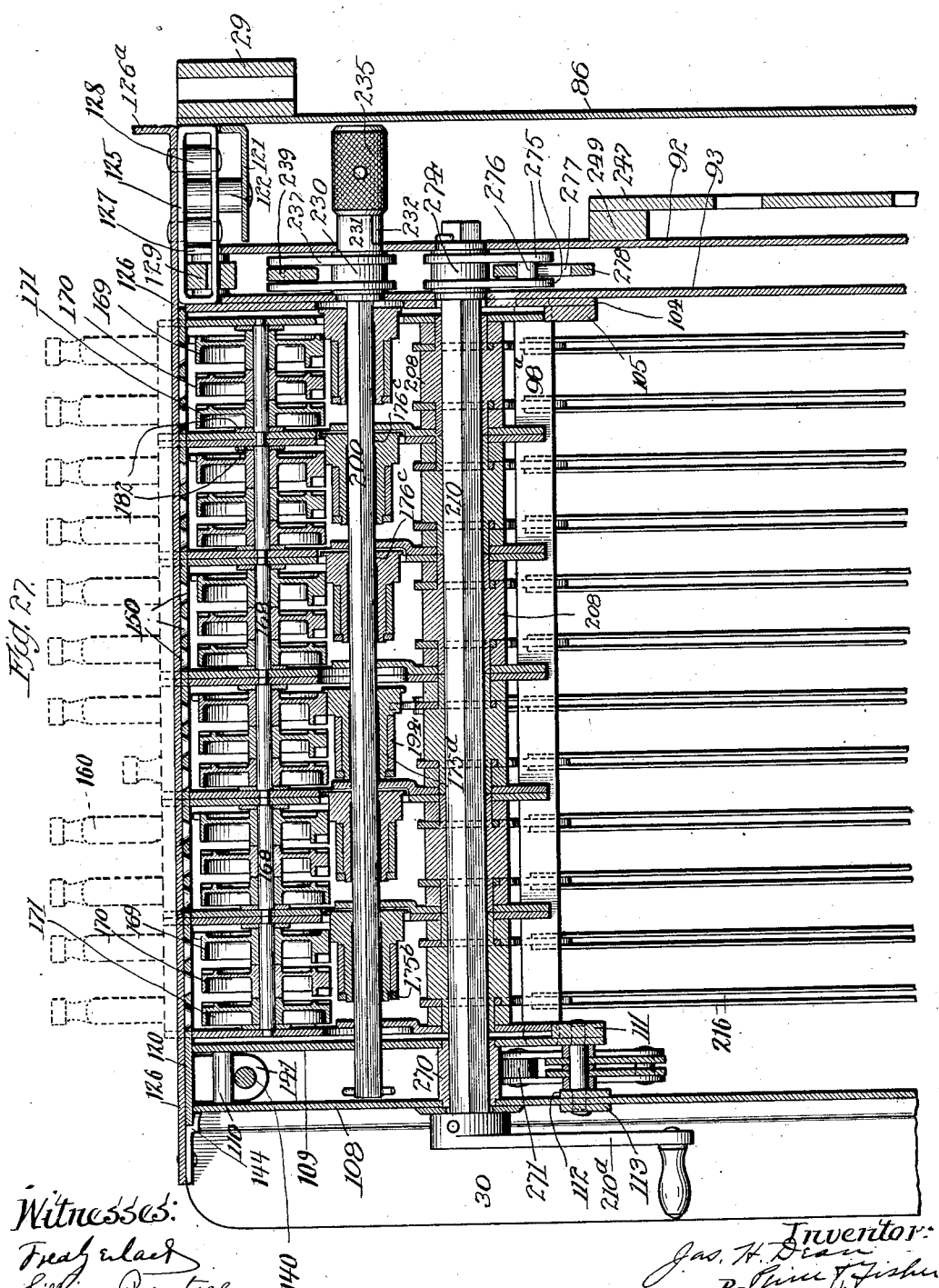

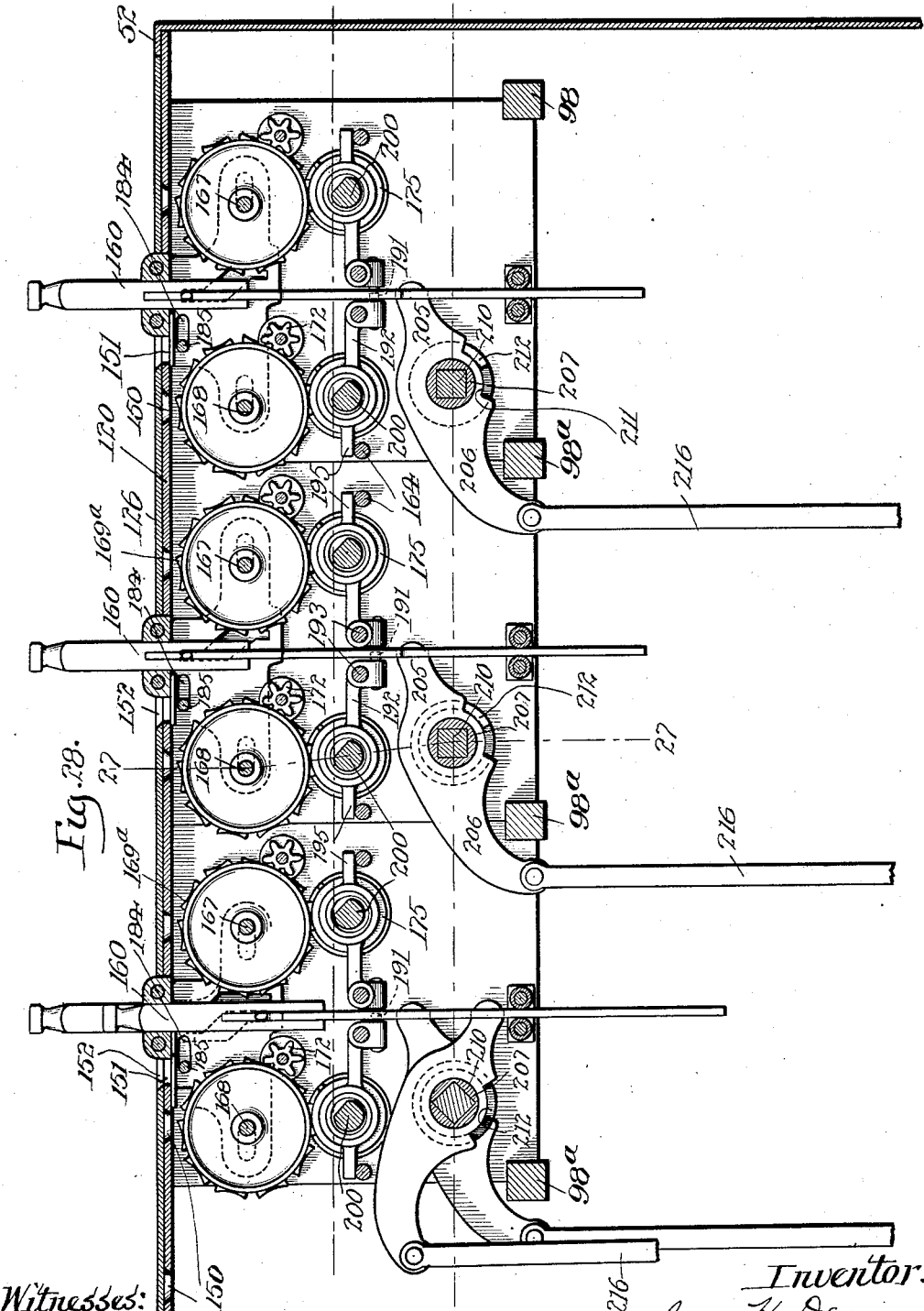

J. H. DEAN.
VOTING MACHINE.
APPLICATION FILED DEC. 27, 1904.
1,013,646.
Patented Jan. 2, 1912.
19 SHEETS—SHEET 19.
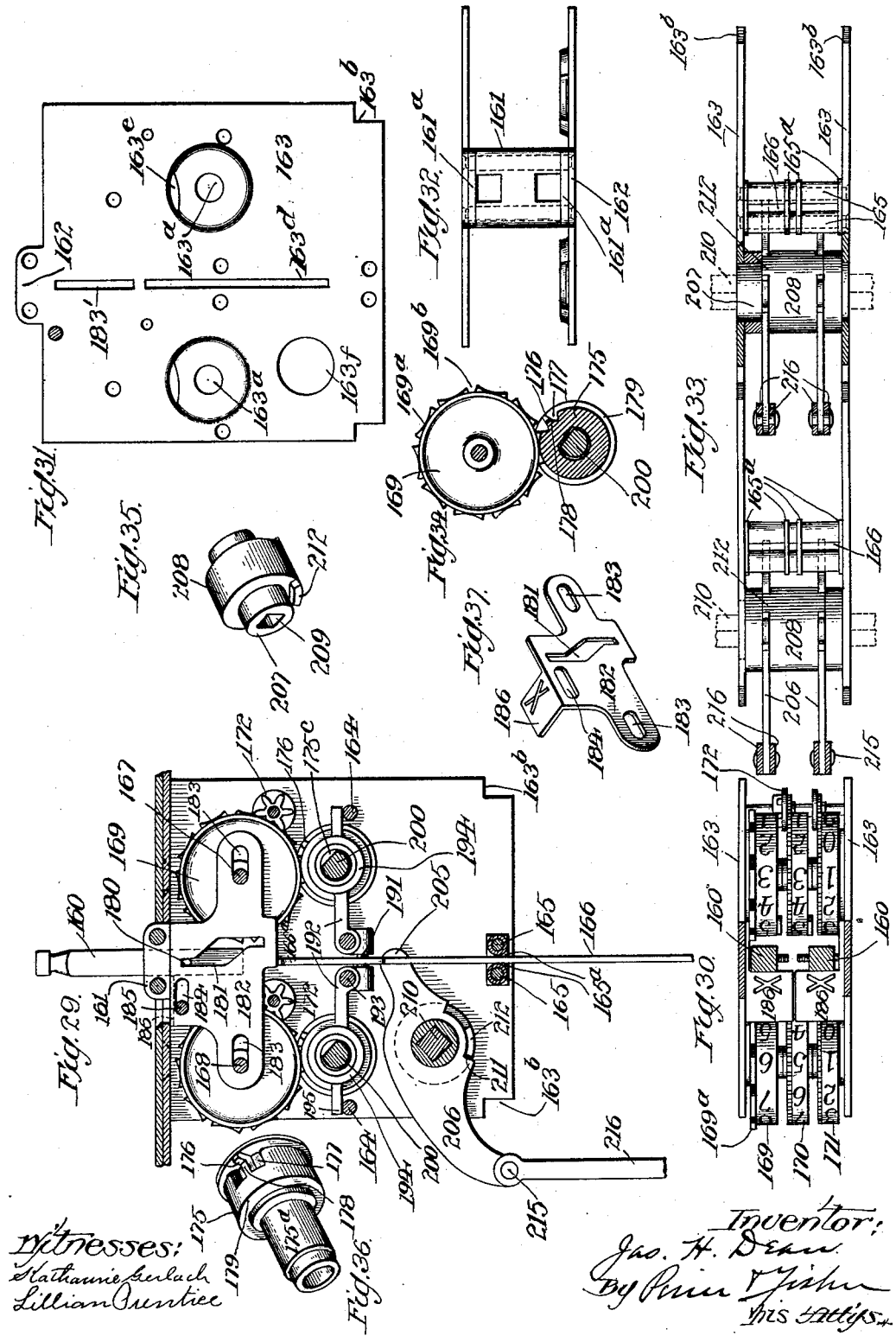

UNITED STATES PATENT OFFICE.

JAMES H. DEAN, OF CHICAGO, ILLINOIS, ASSIGNOR, BY MESNE ASSIGNMENTS, TO EMPIRE VOTING MACHINE COMPANY, A CORPORATION OF NEW YORK.

VOTING-MACHINE.

1,013,646.  Specification of Letters Patent.  Patented Jan. 2, 1912.

Application filed December 27, 1904. Serial No. 238,388.

*To all whom it may concern:*

Be it known that I, JAMES H. DEAN, a citizen of the United States, residing at Chicago, in the county of Cook and State of Illinois, have invented certain new and useful Improvements in Voting-Machines, of which the following is a specification.

The present invention has relation more particularly to the type of voting machines set forth in Letters Patent of the United States No. 636,730, granted to my assignees November 7, 1899, and the invention consists in various features of improvement hereinafter described, illustrated in the accompanying drawings and particularly pointed out in the claims at the end of this specification.

Figure 13:
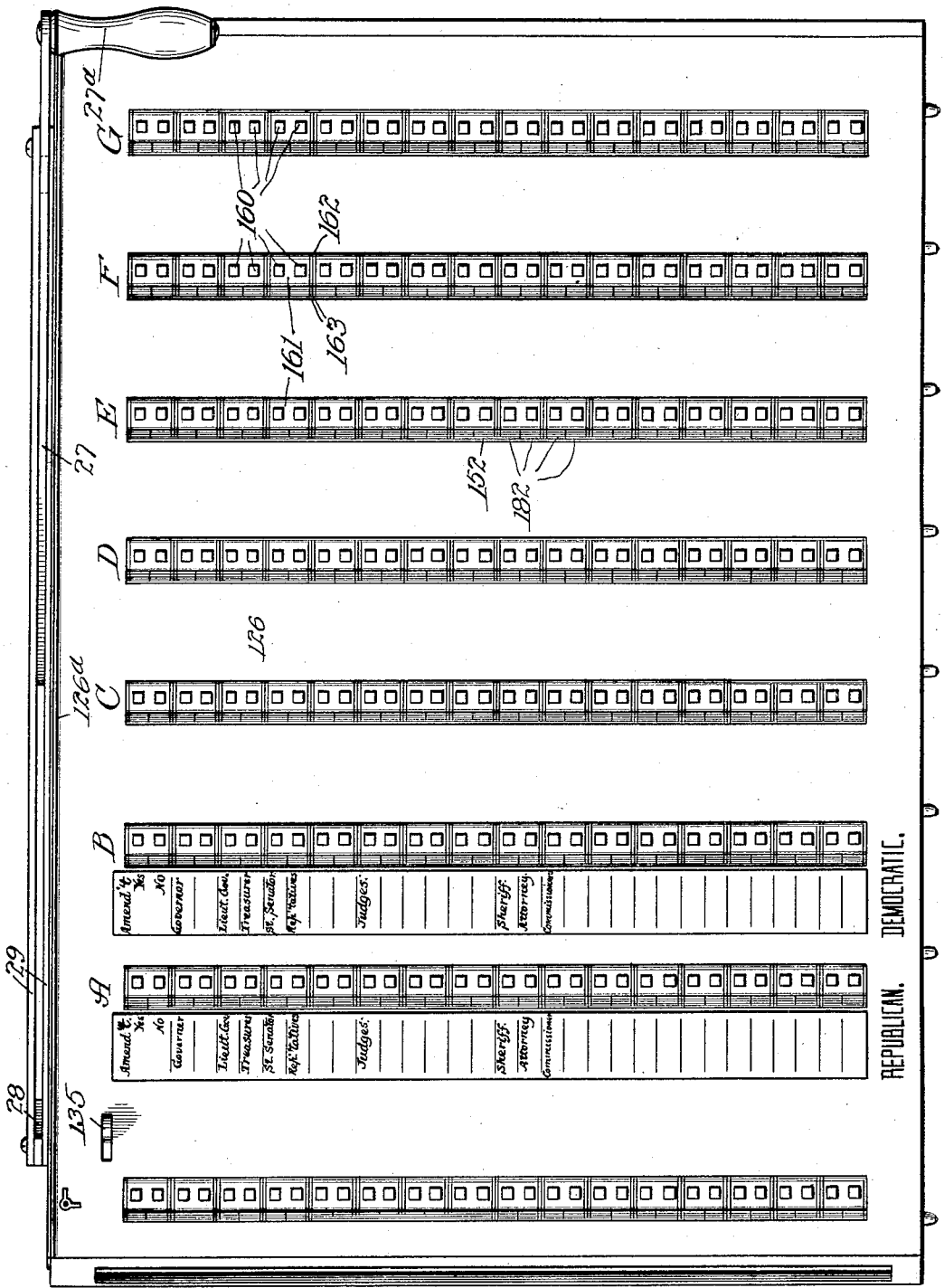
Figure 25:
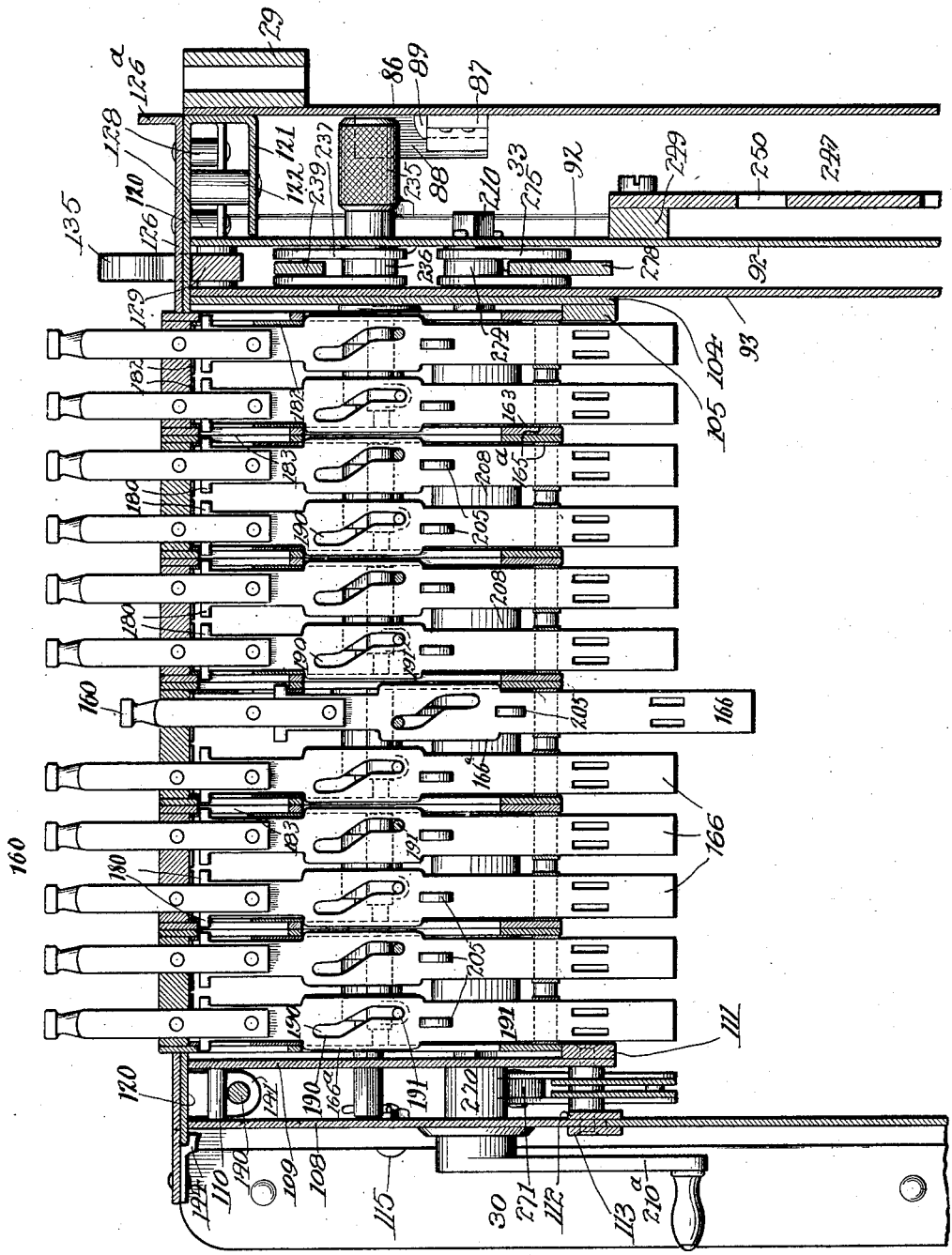

Figure 1 is a front view of a voting machine embodying my invention, the curtains of the booth-frame being omitted from this and other views of the machine. Fig. 2 is a rear view of the machine. Fig. 3 is a left-hand side view of the machine, the front curtain-rod being shown in dotted lines. Fig. 4 is a detail view of one of the side doors of the inclosing casing. Fig. 4ª is a detail view in vertical section of part of one side door. Figs. 5 and 6 are detail views in horizontal section through the side door shown in Fig. 4 and through the parts connected thereto. Fig. 7 is a plan view of the booth-frame. Fig. 8 is a view in horizontal section through the booth-frame and the inclosing casing. Fig. 9 is an enlarged detail view, partly in plan and partly in horizontal section, showing a portion of the front curtain-rod and the means for supporting and operating the same. Fig. 10 is a view in vertical section (from front to rear) of the inclosing casing, certain parts being shown in elevation. Fig. 11 is a view in front elevation of the inclosing casing with the front door and front corner bars removed, the sides and outer top plate being also shown in section. Fig. 12 is a right-hand end elevation of the inclosing casing. Fig. 13 is a plan view of the inclosing casing. Fig. 14 is a plan view showing the inner top plate of the inclosing casing. Fig. 15 is a detail view in side elevation of the inner plate of the back section of the inclosing casing. Fig. 16 is a detail side view of the inner plate of the front section of the inclosing casing. Fig. 17 is a view in vertical section through the inner and outer top plates of the inclosing casing, and through portions of the side walls of the casing, certain parts beneath the top plates being shown in elevation. Fig. 18 is a back view of the inclosing casing, the upper portion of the back door being broken away and the top plates being shown in section. Fig. 19 is a view showing in side elevation parts at the upper portion of the back of the inclosing casing, the back door and shifter-frame being removed. Fig. 20 is a view similar to Fig. 19, but with the back door, the shifter-frame and certain other parts removed to show the cam-plates. Figs. 21 and 22 are views in vertical transverse section through the upper part of the inclosing casing, showing in side elevation the parts in front of the parts illustrated in Fig. 20. Fig. 23 is a view in horizontal section through the inclosing casing and parts contained therein, this view being upon a line immediately beneath the actuator shafts, certain parts being shown in plan. Fig. 24 is a view in horizontal section through the inclosing casing, and the section frames contained therein, the actuator bars and certain other parts being shown in plan. Fig. 25 is a view in vertical section, from side to side, through the main casing at one side of a row of ballot keys, parts being shown in elevation. Fig. 26 is a view in vertical cross section (from side to side) through the inclosing casing, showing in elevation the counter-wheels and certain other parts. Fig. 26ª is a detail view in vertical section of certain parts at the back of the casing. Fig. 27 is a view in vertical section from front to rear upon the line 27—27 of Fig. 28. Fig. 28 is a view in vertical cross section inside the front plate of the counter section frames, parts being shown in elevation. Fig. 29 is a detail view showing the parts contained within one of the counter sections, the front plate of said section being removed and certain parts being shown in elevation. Fig. 30 is a detail plan view of one of the counter sections and parts contained therein, the extreme upper portions of the side plates being shown in horizontal section. Fig. 31 is a detail view in elevation of one of the plates of a counter section. Fig. 32 is a detail plan view of one of the counter sections with its side plates connected at the top. Fig. 33 is an inverted plan view (parts being shown in horizontal section) showing two of the counter sections grouped together. Fig. 34 is a detail view, partly in section and partly in side elevation, showing the actuator pinion and the unit wheel engaging therewith. Fig. 35 is a detail perspective view of one of the rocker-sleeves. Fig. 36 is a detail perspective view of the actuator pinion in position on its actuator shaft. Fig. 37 is a detail perspective view of the indicator plate.

The construction of the frame-work of the voter's booth and the construction of the casing wherein the inclosed parts of the machine are contained, will best be understood by reference to Figs. 1–12 of the drawings. As shown, the main frame comprises four uprights 1, preferably of metal tubing, the lower ends of which rest upon and are secured to the cross bars 2 that extend from front to back at the sides of the main frame. These cross bars 2 are bolted as at 3 upon the upper faces and at the ends of angle bars 4 and 5 that extend from side to side of the main frame at its front and rear respectively, and these front and rear angle bars 4 and 5 are riveted to the vertical corner posts of the inclosing casing at a slight distance above its base. Across the tops of the pair of tubular posts or uprights 1 at the left-hand side of the main frame (looking from front to back) extends a tubular bar 6 that is united to the front and rear posts or uprights 1 by the couplings 7 and 8 (see Figs. 3 and 7). Similarly across the tops of the posts or uprights 1 at the right-hand side of the main frame extends the tubular bar 9 that is connected to its subjacent posts or uprights by the couplings 10 and 11 and the front end of the bar 9 is bent as at 12 (see Fig. 7) at right angles to the body of the bar for a purpose to be presently stated.

By reference more particularly to Figs. 2, 3 and 7 of the drawings it will be seen that the couplings 8 and 11 at the tops of the rear posts 1 have upwardly extending ears 8ª and 11ª respectively that are united by the tie-bar 14, and from these ears 8ª and 11ª extend downwardly the tie-bars 15 that cross and are bolted together as at 16 and have their lower ends bolted to the upwardly turned lugs or ears 17 at the rear ends of the cross bars 2. From the top bars 6 and 9 will be hung the side and back curtains (not shown) of the booth, and the front curtain of the booth will be suspended at its upper end from the front curtain bar 18 that is fixed by a coupling 19 to the front end of a rod 20 that passes from front to rear through the tubular bar 6 (see Fig. 9). The rear end of the bar 20 has fixed thereto a rock arm 21 (see Fig. 2) to the free end of which is pivotally secured the upper end of a connecting rod 22, the lower end of this rod being pivotally united as at 23 to the upper end of a swinging bar 24 that is pivoted as at 25 to the back door of the inclosing casing. The bar 24 is in turn connected by a link 26 to a hand-lever 27 that is mounted to swing at the back of the inclosing casing, the throw of this lever being limited by stops 28 at the ends of the guide bar 29 that is bolted to the back door of the inclosing casing (see Figs. 2 and 13) and form with the back door a guide slot for the hand-lever 27. It will thus be seen that when the voter is within the booth he can, by grasping the handle 27ª of the hand-lever 27, swing the lever 27 from right to left, or vice versa, within the limits of the stops at the ends of the guide bar 29. When the hand-lever 27 is in the position shown in Figs. 1 and 2 of the drawings, i. e., at the right-hand side of the inclosing casing, the front curtain rod 18 will be in horizontal position so that the curtain thus closes the front of the booth. At such time, as will be seen by reference to Fig. 2, the connecting rod 22 and swinging bar 24 will be across the dead center and consequently the front curtain rod 18 and curtain will be maintained in raised position. If the hand-lever 27 be swung from the position shown in Figs. 1 and 2 to the opposite side of the inclosing casing, i. e., from right to left, the link 26 and swinging bar 24 will cause the connecting rod 22 to swing outwardly and downwardly and through this rod 22, the rock arm 21 shaft 20 and coupling 19, the front curtain rod 18 will be swung downwardly so as to permit the voter to pass from the booth.

By reference now to Figs. 1 and 7 of the drawings, it will be seen that the purpose of the angular end 12 of the top curtain bar 9 is to hold a portion of the side curtain around the front of the booth so that the front curtain carried by the rod 18 may, when in closed position, better conceal the voter in the booth.

The preferred construction of casing for inclosing various parts of the mechanism will best be understood by reference to Figs. 1 to 14 of the drawings. The corner posts of the inclosing casing are preferably formed of the four angle bars 30, 31, 32 and 33, (see Fig. 8), the bars 32 and 33 being riveted to the back bar 5, (see Fig. 2). To the front angle bars 30 and 31 is riveted the front base plate 34, the upper edge of this plate 34 being preferably riveted as seen in Fig. 1, to the bar 4 and the ends of the plate 34 being riveted to the corner posts 30 and 31. At the front of the machine and above the front base plate 34 extends the door 35, one end of this door extending behind and being retained by the corner post 30 while the opposite edge of the door is practically flush with the corner post 31 and bears against and is supported by a bracket 36 that is riveted to the corner post 31, (see Figs. 1, 8 and 11). The bracket 36, against which the inner face of the door 35 rests, is provided with an outwardly projecting staple 37 that passes through a hole formed in the door 35 and receives a suitable padlock 38 to retain the door in position. Preferably, as seen in Fig. 1 of the drawings, the front door 35 is provided with a concavo-convex shield 39 extending over the staple 37. Above the front door 35 of the casing there extends from side to side a plate 40, the ends of which are suitably fastened, as by rivets, to the corner posts 30 and 31 and upon the inner face of the front plate 40 is riveted a bar 41$^a$ (see Fig. 10) that serves to support certain of the parts, as will presently more fully appear. Upon the top edge of the front plate 40 rests the front slide plate 41, the bottom of this plate being guided between the bars 42 and 43 that are riveted respectively to the front and back faces of the front plate 40.

By reference more particularly to Fig. 10 of the drawings it will be seen that upon the cross bars 4 and 5 at the base of the inclosing casing is secured the bottom plate 44, and this bottom plate 44 with the upper shelf or plate 45, forms a compartment of the inclosing casing adapted to receive free or independent ballots. The plate or shelf 45 has its front edge riveted to the lower edge of the fixed front plate 40 and this shelf or plate 45 is preferably formed with a depending flange 46 that is riveted to the side walls of the inclosing casing.

In the preferred construction of the inclosing casing one end comprises a side plate 50 (see Figs. 8 and 12) that is riveted to the corner posts 31 and 32, the lower portion of the plate 50 being cut away to permit the cross bars 4 and 5 to pass therethrough. The side plate 50 (at the right-hand side of the inclosing casing) extends to the top of the cross plate or shelf 45 and from the upper edge of the side plate 50 extends a removable door 51 (see Figs. 1 and 12), the upper edge of which is formed with an angular portion 52 (see Figs. 1 and 21) that projects over the top of the casing, as will presently more fully appear. One end of the side door 51 is perforated to receive bolts 53 (see Figs. 2, 11 and 12) that pass through the corner post 32 and the opposite end of the side door 51 is formed with open-ended slots 54 adapted to receive the studs 55 that project outwardly from the front corner post 31. In placing the side door 51 in position, the slotted end will be first slipped into engagement with the studs 55, and bolts 53 will then be passed through the perforations in the end of the side door 51 and through corresponding holes formed in the back corner post 32. The retaining nuts of the bolts 53 will be protected by the back door of the inclosing casing, as will hereinafter appear.

The opposite or left-hand side of the inclosing casing is shown as comprising a lower side plate 60 that is riveted to the front and rear corner posts 30 and 33, (see Figs. 3 and 8), the lower portion of this side plate 60 being cut away to receive the cross bars 4 and 5. Spacing strips 61 are interposed between the corner posts 30 and 33 and the side plate 60 in order to bring the side plate 60 in line with the outer plate of the removable side door immediately above it. The upper edge of the side plate 60 extends to the line of the floor or shelf 45 and the left-hand side of the inclosing casing from this point to the top is formed of a removable door. This side door is shown as formed of the outer plate 63 and the inner plate 64, these plates being riveted together with intermediate vertical spacing strips 65 at their ends, (see Figs. 5 and 6 and 21 to 23). The top of the inner plate 64 (see Figs. 1, 21 and 22) of the side door is formed with an angular portion 66 adapted to set over the top plate of the inclosing casing. One edge of this side door is formed with holes 67 adapted to receive retaining bolts 68 that pass through the rear corner post 33, and the front edge of this side door is formed (see Fig. 4) with open-ended slots 69 that receive the headed studs 70 that project from the corner post 30. It will thus be seen that when the side door is to be set in position, the slotted end will be slipped into engagement with the studs 70 and the bolts 68 will then be passed through the holes 67 in the opposite end of the door and through the holes in the corner post 33 and the retaining nuts of the bolts will then be screwed to place. The nuts of the bolts 68 will be protected by the back door of the inclosing casing. The inner plate 64 of the side door is preferably formed with a cutaway space 64$^a$ extending approximately from end to end, the purpose of this cutaway space being to permit the printing mechanism to be projected through the plate 64 and impress a ballot that may be within the slot 71 formed between the outer and inner plates 63 and 64 of the side door.

By reference to Figs. 1 and 4 it will be seen that the outer plate 63 is preferably provided with a U-shaped channel bar 63$^a$ riveted thereto, the purpose of this channel bar being to reinforce the outer side plate 63 at a point opposite that at which the printing mechanism for the free ballots operates. The upper edge of the outer plate 63 is preferably flared outwardly, as seen in Figs. 1 and 18 to 22, so as to permit the free ballots to be more readily dropped into the slot or space 71 from which they will pass into the compartment between the floors 44 and 45 of the inclosing casing.

The back of the inclosing casing (see Figs. 2, 8 and 10) is shown as comprising a stationary back plate 80 that is riveted to the corner posts 32 and 33 and to the rear cross bar 5. This back plate 80 extends upwardly to a point approximately in line with the upper edge of the fixed front plate 40 and upon the inner face of the back plate 80 are riveted the upper and lower cross bars 81 and 82 that form supports for certain parts of the inclosed mechanism. From the back plate 80 projects a staple 83 adapted to pass through a hasp 84 pivotally connected as at 85 to the lower end of the removable back door 86, a lock 83$^a$ being employed to retain the hasp upon the staple. The back door 86 (see Figs. 10, 18, 23 and 25) is provided adjacent its ends and upon its inner face with a number of laterally projective hooks or brackets 87 adapted to enter the cut-away spaces 88 formed in the corner posts 32 and 33 and the free ends of the hooks or brackets 87 will engage with the projecting portions or shoulders 89 of the corner posts at the fronts of the cut-away spaces 88 of said posts. It will be understood that when the back door 86 is to be placed in position, the free ends of the brackets 87 will first be passed into the upper portions of the cut-away spaces 88 and will then be dropped behind the projecting portions or shoulders 89 so as to interlock therewith, and the hasp 84 will then be set over the staple 83 and the lock 83$^a$ will be secured to the staple. As shown, the back door 86 is provided with a journal plate 90 (see Figs. 2, 10 and 18) for the shaft of the hand-lever 27 and above the journal plate 90 the door 86 is formed with a slot 91 to permit the swinging of a stud (see Figs. 2 and 18) that connects the hand-lever to a rocking-arm that is secured by said stud to the hand-lever and is mounted also upon the hand-lever shaft. The back plate 86 is furthermore provided with a hole through which passes the bolt or stud 25 on which the lower end of the rocking bar 24 is pivoted.

In line with the upper edge of the back plate 80 (see Fig. 10) extends the outer plate 92 of a frame or section for supporting certain mechanism to be presently described, the inner plate 93 of this frame or section being connected to the outer plate 92 by studs 94. By reference to Figs. 16, 17, 21 and 22 of the drawings it will be seen that the plates 92 and 93 have the lower portions of their ends cut-away, as at 95, and above these cut-away spaces 95 the plates 92 and 93 are further cut-away to receive the supporting bars 97 and 98, (see Figs. 15, 16, 21 and 22). The ends of the bar 97 are reduced and pass through holes formed in the corner posts 30 and 33, (see Fig. 10), the ends of the bar 97 being upset to securely hold them to the posts; and in like manner, the ends of the bar 98 are reduced and pass through the holes in the corner posts 31 and 32 and have their ends upset to retain them in position (see Fig. 24). It will thus be seen that the plates 92 and 93 of the back frame or section can be dropped down over the cross bars 97 and 98, the cut-away spaces 95 permitting the frames to be thus set over the cross bars 97 and 98 until these bars are received in the spaces formed in the plates 92 and 93 above the cut-away spaces 95. When the back frame is thus placed in position upon the cross bars 97 and 98 it will be secured to the corner posts 32 and 33 by bolts 100 and 101 (see Figs. 10, 18 and 19) that will pass through the corner posts 32 and 33 respectively, the nuts of these bolts 100 and 101 overlapping the ends of the plate 92 and securely binding the plate to the corner posts. Upon the inner face of the plate 93 is riveted a plate 104 (see Fig. 15) and along the lower edge of this plate 104 upon its inner face is riveted a cross bar 105, the plate 104 being formed with holes 104$^a$ (see Fig. 15) to receive the reduced ends of a series of supporting bars 98$^a$ that set within seats 105$^a$ formed in the cross bar 105. The opposite ends of the supporting bars 98$^a$ are sustained by a front frame or section that is formed of outer and inner plates 108 and 109, (see Figs. 10 and 16), the outer plate 108 being in line with the front slide 41 of the casing and being connected to the back plate 109 by suitable studs 110. Upon the inner face of the plate 109 is secured a bar 111 that is formed with seats 111$^a$ to receive the ends of the supporting bars 98$^a$, the extreme ends of these bars 98$^a$ being reduced to enter holes formed in the plate 109 adjacent the seats 111$^a$. At its lower edge the outer plate 108 has riveted thereto the inner and outer bars 112 and 113 that set over the upper edge of the front slide 41. The front plates 108 and 109 have the lower portions of their ends cut away (similarly to the plates 92 and 93 of the back section) and at the tops of these cut-away spaces the plates 108 and 109 are formed with seats 109$^a$ to receive the cross bars 97 and 98. The ends of the front section are securely held to the corner posts 30 and 31 by means of bolts 115 (see Figs. 1 and 10) that pass through the corner posts and through the plate 108, the nuts of the bolts being upon the inside of the casing.

Over the front section composed of the plates 108 and 109, and the back section composed of the plates 92 and 93 extends the inner cover plate 120 (see Fig. 10) and at one side this inner cover plate 120 is overlapped by the inwardly bent portion 52 at the top of the sliding side door 51, and at its opposite side is overlapped by the inwardly bent portion 66 at the top of the inner plate 64 of the opposite side door, (see Figs. 21 and 22). At its rear edge, the inner top plate 120 is formed with the downwardly and inwardly turned portion 121 (see Figs. 10, 26 and 27), the inwardly turned part of the plate being riveted to the inner top plate 120 by means of the studs 122, (see Fig. 26). The bent portion 121 forms a chamber that extends between the rearmost section plate 92 and the back door 86, the edge of the reverted portion 121 of the top plate 120 reaching to or approximately to the plate 92. The inner top plate 120 is formed at its rear edge with cut-away spaces 124 (see Figs. 14 and 19) adapted to receive loops or staples 125 (see Figs. 19, 25 and 27) that are riveted to the under side of the outer top plate 126 and the upper portions of the rear section plates 92 and 93 have their edges cut away as at 127 to admit the loops or staples 125. The rivets 128 that unite the loops or staples 125 to the under side of the top plate 126 preferably extend through the loops and give increased strength thereto.

By reference to Figs. 21 and 22 of the drawings, it will be seen that there is mounted between the upper portions of the section plates 92 and 93 a locking bar 129 that is slidably mounted upon the studs 130 that pass through the slots 131 of the bar, these studs 130 being riveted to the plates 92 and 93. The locking bar 129 is provided with the cut-away spaces 132 that form the projections 133. The open tops of the spaces 132 are sufficiently broad to receive the loops or staples 125 when the bar is in unlocked position, i. e., in position opposite that shown in Fig. 21 of the drawings, but when the bar 129 is in locked position the projections 133 of the bar pass above the lower members of the loops or staples 125 and thus securely lock the top plate 126 in place. The locking bar 129 is provided adjacent one end with an upwardly extending arm or handle 135 that passes through slots formed in the outer and inner top plates 126 and 120 and enables the locking bar to be shifted when the outer top plate 126 is to be removed. A lock 137 (see Fig. 14) is secured to the under side of the inner top plate 120 and the bolt 138 (see Fig. 21) of this lock will enter a notch 139 of the locking bar 129 when the bar is to be held in the locked position shown in Fig. 21 for the purpose of retaining the outer top plate 126 in position. The bar 129 is preferably provided, as shown, at one end with a depending angular arm 129$^a$ that is pivoted to the bar 129 as at 129$^b$ and the upper end of the arm 129$^a$ is connected to the bar 129 by means of a shearing-pin 129$^c$ of relatively soft or weak material.

The purpose of the depending arm 129$^a$ is to prevent any nefarious removal of the outer top plate 126, even if the voter or other person attempting such act, were possessed of a key adapted to operate the locking bolt 138. By reference to Fig. 22 it will be seen that when the voter is within the booth and the front curtain is closed, the connecting bar that links the several actuator shafts (to be presently described) located immediately beneath the bar 129 is in such position that the bar 129 cannot be shifted because of the engagement of the arm 129$^a$ by the end of the connecting bar that unites the cranks on the actuator shafts. Hence, even if a voter were possessed of a key adapted to actuate the bolt 138, he could not remove the outer top plate 126 (for the purpose of inspecting the counter mechanism, or for other purposes) because he would be unable to lift the outer top plate on account of the engagement of the staples 125 with the projections 133 of the sliding bar 129. It will be seen, however, that if the arm 129$^a$ were formed integral with the end of the bar 129, there might be danger of a breakage of the parts under the following conditions, viz: if, after the outer top plate 126 were set in position above the inner top plate 120, and the staples 125 did not reach to the bottom of the slots 132, the bar 129 could not be moved to the position shown in the drawings because the projections 133 would contact with the lower members of the staples 125. Hence, when the voter entered the booth and, by shifting the operating lever to close the front curtain, turned the actuator shafts, (as will presently appear), the end of the connecting bar 239 would strike the depending arm 129$^a$ and there would be danger, if there was no yielding of this arm 129$^a$, of a breakage of some of the important parts of the mechanism. By pivoting the arm 129$^a$ and holding it with a certain degree of rigidity by shearing-pin 129$^c$, the severe strain upon the lower member of the arm 129$^a$ will cause the shearing-pin 129$^c$ to give way before any breakage of other parts could occur.

By reference to Figs. 16 and 27 of the drawings it will be seen that beneath certain of the studs 110 that extend between and connect the upper portions of the front section plates 108 and 109 extends a retaining rod 140 that passes through holes formed in loops or eyes 141 that depend from the inner top plate 120. This rod 140, therefore, serves to hold the top plate 120 against being lifted or forced upward at those points that are not adjacent to the bent-over portions 52 and 66 of the inner plates of the side doors of the inclosing casing, which bent-over portions hold the adjacent edges of the inner top plate 120. To the under side of the outer top plate 126 at its front are secured the angular hooks or plates 144, (see Figs. 1, 10 and 27), the free edges of which are adapted to project under and engage the front edge of the inner top plate 120. The back of the outer top plate 126 is preferably formed with an upturned flange 126ª in order to give greater stiffness to the plate. It will thus be seen that when the outer top plate 126 is to be set in position, the hooks 144 will be slipped into engagement with the front edge of the inner top plate 120, after which the loops or staples 125 attached to the underside of the outer top plate, will be passed through the cut-away spaces in the inner top plate 120 and into the cut-away spaces 132 of the locking-bar 129 (see Fig. 21). The locking-bar will then be shifted by the handle 135 until its projections 133 extend within the loops 125 and securely hold the outer top plate 126 against lifting. The bolt 138 of the lock 137 will then be turned by a suitable key into the notch 139 of the locking bar, thus preventing longitudinal movement of the bar. It will be understood, of course, that suitable holes are formed in the top plates 120 and 126 (see Figs. 13 and 14) for the admission of the key to the lock 137.

The inner top plate 120 is formed with a plurality of sight openings 150 (see Figs. 14 and 28) through which the numbers on the counting wheels of the registering mechanism can be seen, but these sight openings 150 are normally covered by the outer top plate 126 (see Fig. 13). The inner top plate is also formed with sight openings 151 through which will be disclosed the individual vote indicators, as will presently more fully appear, and, with these indicator sight openings 151 of the inner top plate, register the corresponding sight openings 152 of the outer top plate 126. The sight openings 151 and 152 (as shown in Figs. 13 and 14 of the drawings) are preferably long slots that extend approximately from front to back of the top plates of the inclosing casing and through these slots 151 and 152 project the individual ballot keys, as will presently more fully appear.

From the foregoing description it will be seen that so long as the side doors of the inclosing casing remain in position, their top angular portions 52 and 66 will securely retain the inner top plate 120 in position, thus guarding against access from the top, to the mechanism inclosed within the casing. When, however, the side doors have been removed and the retaining rod 140 (see Fig. 16) has been withdrawn from the staples 141, the inner top plate 120 may be lifted to permit access to the mechanism inclosed within the upper part of the casing. Inasmuch as the door at the left-hand side of the machine is held against movement (see Figs. 3 to 6) until the bolts 68 are withdrawn and, inasmuch as the door 51 at the right-hand side of the machine is similarly held in position until the bolts 53 are withdrawn (see Figs. 1 and 12), and, as the nuts of these bolts 68 and 53 are inside the back door 86 of the casing, it will be seen that the side doors cannot be removed until the back door 86 is released by the withdrawal of the lock 83ª from the staple 83 (see Fig. 10); but when the lock is thus withdrawn and the hasp 84 removed from the staple, the back door 86 can be lifted so as to disengage its hooks or plates 87 from the adjacent corner posts of the main frame, it being understood, of course, that the connecting rod 22 at the back has first been released from the swinging bar 24. After the back door is removed the side doors can be withdrawn, as hereinbefore described. It will also be seen that inasmuch as the front slide 41 is held in position by the removable side doors, this slide 41 cannot be withdrawn until these side doors have been removed, as above described.

By reference to Fig. 13 of the drawings, it will be seen that the outer top plate of the inclosing casing is marked adjacent the various slots that extend transversely thereof, with the names of the several offices, and the amendments or like questions for which the voter is to cast his ballot and these will be printed or otherwise marked upon labels attached to the upper face of the top plate of the casing. The names of the several nominees of each party will appear in individual party columns adjacent the corresponding offices and provision is made whereby the voter may vote a straight party ticket or may vote a "split" ticket, i. e., by dividing his votes between nominees of the different parties or by casting an independent ballot or ballots for unnominated candidates of his own choice.

Through the top plates of the inclosing casing extend upwardly a series of ballot keys 160, these keys being mounted to slide in vertical direction through key guides 161 that are bolted between the extensions 162 formed at the top of the side plates 163 of each of the counter section frames (see Figs. 29 and 31). Preferably, plates 161ª are interposed between the ends of the key guides 161 and the projections 162 in order to more accurately guide the ballot keys 160. As shown, each counter section frame contains two ballot keys 160 and the counters and counter actuating devices immediately controlled by said keys and each key within a counter frame or section corresponds to one or another of the offices for which ballots are to be cast, or to the favorable or adverse vote on the special questions (such as constitutional amendments or the like) that may be submitted to the voter. The frames are nested together in the upper part of the inclosing casing, as clearly indicated in Figs. 10, 23 and 27. In Fig. 23 the counter frames are shown in number corresponding to all the offices indicated in Fig. 13 of the drawings, but in the remaining figures above mentioned, a lesser number of counter frames are shown in order to enable them to be illustrated upon a larger scale. Thus, by reference to Fig. 23 of the drawings, counter frames with contained mechanisms are illustrated in number adapting the machine for ballots for thirty offices of seven distinct parties and in addition the machine is adapted for the casting of irregular or independent ballots for the various offices and counter frames containing mechanism for enabling the voter to cast his ballot for or against amendments or like questions submitted, are arranged at one end of each of the several rows of counter frames that comprise the party groups or columns and the independent ballot group or column.

By reference more particularly to Figs. 29 and 31 it will be seen that the side plates 163 of each counter section are riveted together as at 164, 165 and elsewhere, the rivets 165 serving also the function of guiding the lower ends 166 of the ballot keys 160. Upon the rivets 165 are placed tubular sleeves and these rivets 165 pass through guide plates 165$^a$ (see Fig. 33) that serve to better hold the stems of the ballot keys in alinement. Between the side plates 163 of each section extend the shafts 167 and 168, the ends of these shafts being riveted to the side plates 163, and upon each of these shafts is arranged a group of three counting wheels 169, 170 and 171 (see Fig. 30) adapted to register respectively units, tens and hundreds. The gear mechanism, whereby revolution is transferred from the units wheel to the tens wheel and from the tens wheel to the hundreds wheel, is of familiar construction and need not be more specifically described, although by reference to Fig. 29 of the drawings there will be seen the transfer or star wheels 172 whereby this operation is effected. The units wheel 169 is provided about its rim at one side with teeth 169$^a$ having curved faces adapted to ride against the periphery of the actuator pinion 175 (see Figs. 34 and 36), the periphery of this pinion being upon the pitch line of the tooth 176 with which said pinion is formed. At each side of the tooth 176 on the periphery of the actuator pinion 175 is formed a long slot 177 (see Fig. 36) and these slots 177 will receive the teeth 169$^a$ of the units wheel 169 when the tooth 176 of the actuator pinion 175 enters an interdental space 169$^b$ of the wheel 169. The purpose in making the slots 177 longer than the width of the pin 176 is to enable the teeth 169$^a$ of the units wheel to enter the slots 177 even should the voter fail to move the actuator pinion 175 longitudinally of its shaft (in manner to be presently defined) a sufficient distance to bring the tooth 176 of the pinion into full engagement with the teeth 169$^a$ of the units wheel. A further advantage incident to extending the shallow wall 178 between the slots 177 is to prevent the possibility of any shifting of the units wheel independently of the movement of the actuator pinion and while the teeth of the units wheel are within the inwardly extending portions of the slots 177, since obviously, if there were no wall 178 between the slots 177, it would be possible, when the teeth of the units wheel were opposite such points, for the voter to shift the units wheel, if by any means he could obtain access to such wheel, or even by the severe jarring of the machine. The plain inner portion 179 of the actuator pinion, when in engagement with the teeth of the units wheel, serves to lock the wheel against rotation. The actuator pinion 175 is preferably formed at one end with a raised flange that serves to reinforce the tooth 176. The group of counting wheels upon the shaft 167 is designed for registering the votes for the office corresponding to one of the ballot keys 160 in the counter frame while the counting wheels upon the shaft 167 serve to register the votes cast for the office corresponding to the other ballot key 160 in the same counter frame or section. Two ballot keys, two sets of counter wheels and their actuating mechanism, (the sets being substantially identical in construction) are grouped within each counter frame, but a description of one set will answer for both.

By reference to Fig. 25 of the drawings it will be seen that at the upper end of the stem 166 of each of the ballot keys 160 there is formed an offset 180 that passes through a cam-shaped slot 181 (see Fig. 29) that is formed in an indicator plate 182 and through a guide slot 183' formed in the adjacent side wall 163 of the counter frame. Two of these lugs or lateral extensions 180 are shown at the top of each voting key stem, but, one only is operative, the other being a mere incident to the forming of the key stems for interchangeability. As clearly seen in Figs. 29 and 37, each indicator plate 182 is formed with slots 183 through which pass the shafts 167 and 168, and is formed also with a slot 184, through which passes a rivet 185 (see Fig. 29) extending between the plates 163 of the counter frame and beneath the laterally turned tongue 186 of the indicator plate, this tongue bearing a suitable mark (as the letter " X ") to indicate that the voter has cast his ballot. By extending the rivet 185 beneath the tongue 186 the danger of the voter breaking the tongue 186 by a pointed instrument or otherwise, is avoided. The slot 181 of each indicator plate is formed with an upper and lower inclined wall and the passage of the lug or extension 180 at the top of each key stem against the lower inclined wall of the slot 181 will force the indicator plate in one direction so as to cause the tongue 186 to pass beneath the sight opening of the top plates 120 and 126. On the other hand, when this ballot key 160 is restored to normally raised position, the passage of the lug or projection 180 along the upper inclined wall of the cam-slot 181 will shift the indicator plate 182 so as to cause the tongue 186 (or at least the marked portion thereof) to pass from beneath the sight openings of the top plates 120 and 126. As has been already stated, there is an indicator plate 182 for each ballot key 160 but, as is clearly seen in Fig. 30 of the drawings, the tongue 186 of these indicator plates 182 are bent in opposite directions, although otherwise the constructions of the indicator plates are identical.

By reference to Figs. 25 and 31 of the drawings, it will be seen that the stem of each ballot key 160 is provided with a lateral extension 166ª that is guided in a groove 163ᵈ of the adjacent side plate 163 and with a cam-shaped slot 190 into which extends a pin 191 projecting from the pivot end of the actuator bar 192, (see Fig. 29), this bar being mounted in manner free to slide upon a stud 193 extending between the side plates 163 of each counter frame. Each actuator bar 192 (of which there are two in each counter frame) is formed with a sleeve 194 that encircles the reduced barrel 175ª of the actuator pinion 175, the end of the barrel 175ª being further slightly reduced and fitted with a retaining washer 175ᵇ (see Fig. 27) that is held in position by upsetting the end of the barrel. Each actuator bar 192 is preferably provided with an arm or tongue 195 that rests upon the rivet 164 adjacent thereto. The actuator pinions and actuator bars are identical in construction, it being understood that in assembling these parts, the pair of actuator bars on each counter section will be oppositely disposed, as clearly shown in Fig. 28 of the drawings.

Through holes 163ª in the side plates of all of the counter sections extend two actuator shafts 200. One of the side plates 163 is offset adjacent its hole 163ª to receive the raised flange of the actuator pinion 175, (see Fig. 24) and, as clearly shown in Fig. 31, the top of this offset is cut away as at 163ᵉ to prevent interference with the hundreds wheel within the next counter frame. The other side plate 163 of each counter frame is formed with a plain and enlarged hole for the passage of the actuator shaft 200. Each of the actuator shafts 200 is formed preferably with a flattened portion that will be engaged by a correspondingly shaped lug 175ᶜ formed at one end of the bore of the actuator pinion 175. The bore of each of the actuator pinions 175 and of the pinion barrel is preferably formed of slightly greater diameter than the actuator shaft so as to avoid friction in the sliding of the pinions lengthwise of the shafts. By supporting the actuator bars 192 from the studs 193 and 164, all the actuator pinions will be brought into exact alinement, when the various counter frames constituting a party group are assembled side by side, as clearly shown in Fig. 27 of the drawings, thus enabling the actuator shafts 200 to be passed through the bores of the actuator pinions, so avoiding the danger of the binding of the actuator pinions upon the shafts in event of any slight variation of the shafts from true line. The lower corners of the side plates 163 of the counter frames are cut-away as at 163ᵇ (see Figs. 29 and 31) and, when each counter frame with its group of counting wheels, actuator pinions, etc., is to be placed within the machine, the cut-away corners 163ᵇ of certain of the sections will engage the cross bar 98 adjacent the right hand side of the inclosing casing (see Fig. 28) and the cut-away corners of other counter frames will engage the cross bars 98ª that extend at their rear ends through the vertical plate 93 of the back section and at their front ends through the vertical plate 109 of the front section (see Fig. 26), the bars 105 and 111 that extend beneath the ends of the cross bars 98ª being notched to receive these cross bars (see Fig. 15).

By reference to Fig. 26 of the drawings it will be seen that the ends of the bars 98ª are reduced and rounded to enter holes formed in the plates 93 and 109, and these holes will be made slightly larger than the ends of the bars so as to permit the bars to be readily slipped in place when the machine is being assembled. The plates 93 and 109 thus serve to hold the bars 98ª against movement in upward direction. From the foregoing description it will be seen that when the voter depresses one of the keys 160 the cam slot 190, (see Fig. 25), by the engagement of its upper inclined wall with the pin 191 on the actuator bar 192, will shift the actuator bar and the actuator pinion 175 longitudinally on the actuator shaft 200 (see Figs. 24, 26 and 27), until the tooth 176 (see Fig. 36) of the actuator pinion is brought into position to engage the teeth 169ª of the units wheel 169, it being understood that in the normal or idle position of the actuator pinion 175, the teeth 169ª of the units wheel rest upon the plain portion 179 of the actuator pinion. This depression of the voter's key 160 also causes the lug or projection 180 of the key to contact with the lower inclined wall of the cam slot 181 (see Figs. 29 and 37) of the indicator plate 182, thereby forcing the indicator plate laterally until the mark (the letter "X") appears beneath the sight opening in the top plates 120 and 126 of the inclosing casing. As the ballot key 160 is forced downward, the upper inclined wall of its cam slot 190 contacts with the pin 191 of the actuator bar 192, thereby causing this bar to slide laterally upon the shaft 193 and shaft 200 and to shift the actuator pinion 175 until its tooth 176 is in the same vertical plane as the teeth of the units wheel 169. When the actuator pinion 175 is thus shifted, the tooth 176 will not be in actual engagement with the teeth of the units wheel, but will be in such position, at one side of the vertical plane of its shaft, (see Fig. 34) that when the actuator pinion 175 is turned (in manner to be presently described) the tooth 176 will engage the teeth of the units wheel and will impart a partial revolution to such wheel necessary to register the voter's ballot.

The actuator shafts 200 extend through the several frame or section plates 163 and the inner end of each actuator shaft 200 passes through a hub 230, the reduced ends of which are journaled in the back plates 92 and 93 of the inclosing casing, (see Figs. 21, 22, 24 and 27). Each actuator shaft 200 is united by a clutch to its corresponding hub 230. As shown, this clutch comprises a clutch member 231 formed upon each hub 230, with which engages a corresponding clutch member 232 that is secured to the shaft 200, preferably, by being formed as an inward extension from a milled sleeve or nut 235 that is pinned to the rear end of the shaft 200. Each actuator shaft 200 is of such length that when the back door 86 of the inclosing casing has been removed, as hereinbefore described, the attendant, by drawing outward the sleeve 235 and thus sliding the corresponding shaft 200, will disengage the clutch members 231 and 232, thereby permitting the shaft 200 to be turned independently of the hub 230. In this way the attendant can readily reset the counter or register wheels to zero by first depressing the ballot keys so as to bring the teeth 176 of each actuator sleeve into vertical alinement with the teeth 169ª of the units wheels, as shown in Fig. 34 of the drawings. Obviously, if the counter or register wheels have been moved to different numbers, then, when the attendant has turned the actuator shaft 200 until the counter wheel showing the lowest number is restored to zero, he will retract the ballot key corresponding to such counter or register wheel, so that the further movement of the actuator shaft 200 necessary to restore the remaining counter or register wheels to zero, will not affect such counter or register wheel as has reached the zero position.

Each of the hubs 230 at the rear ends of the actuator shafts 200 is provided with a crank preferably formed of duplicate bars 237 that are united at their free ends by pins 238, these pins 238 passing through a connecting bar 239 that serves to link all the cranks 237 together. The purpose of thus linking the cranks 237 (and, consequently, all the actuator shafts 200) together, is to enable all the actuator sleeves to be restored at one operation to the normal or idle position in readiness for a voter, on entering the booth, to cast his ballot; and this restoring mechanism will next be described.

As shown, the hub 230 on one of the actuator shafts 200 is formed with an arm or extension 240, to the lower end of which is pivotally connected a link 241 (see Figs. 21, 22, 26 and 26ª), the opposite end of this link 240 being pivoted to the upper end of a bifurcated bell-crank lever 242 that is pivotally supported upon a pin 243 extending between the back plates 92 and 93 of the inclosing casing. The lower arm of this bell-crank lever 242 has projecting therefrom a pin 244 (preferably encircled by a friction roller) that enters a cam slot 245 that is formed in the cam plate 246 (see Fig. 20, dotted lines 19, 21 and 22). The pin 244 on the crank arm 242 projects through a slot 245' (see dotted lines Fig. 20) that is formed in the back plate 92 of the inclosing casing. The cam plate 246 is mounted between the back plate 92 (see Fig. 26) and a plate 247 that is secured as by screws 248 at its top and bottom to the back plate 92, suitable spacing strips 249 being interposed between the plates 247 and 92. The cam slot 245 in the plate 246 is formed with straight portions and with an intermediate inclined portion, the purpose of which will presently appear. In the upper part of the plate 247 are formed the long slots 250 into which extend the studs 251 that are fixed to, and project inwardly from, a sliding shifter-frame 252 that is mounted next to the outer face of the plate 247, the heads of the studs 251 (see Fig. 26ª) serving to retain the shifter-frame 252 in position upon the plate 247. The studs 251 at the front and rear ends of the shifter-frame 252 extend into position to engage the cam plate 246 at its front and rear ends, as clearly shown in Fig. 20 of the drawings, so that, as the shifter-frame 252 is moved, the cam plate 246 will be correspondingly shifted. Upon the outside of the shifter-frame 252 is pivotally connected as at 255 a link 256, the opposite end of this link being pivoted as at 257 to the upper end of a crank arm 258 that is mounted upon the shaft 90ª journaled in the boss plate 90 that is fixed to the back door 86 of the inclosing casing (see Figs. 2 and 10). Preferably, the crank-arm 258 is connected to the operating lever 27 by a pin 258ᵃ that passes through the segmental slot 91 in the back door 86 of the inclosing casing. Hence, it will be seen that when the operating lever 27 is shifted by the voter within the booth, (in manner to be presently described), corresponding movement will be imparted to the shifter-frame 252, to the cam plate 246 and, from this cam plate, to the bell-crank lever 242, link 241, arm 240 and connecting bar 239 to the cranks 237 of the hubs 236 at the inner ends of the actuator shafts 200.

By reference to Fig. 18 it will be seen that the lower edge of the shifter-frame 252 is provided with a series of teeth 252ᵃ, at the opposite ends of which are broad and deep spaces 252ᵇ and 252ᶜ. Beneath the shifter-frame 252 and pivotally mounted upon a stud 247ᵃ projecting rearwardly from the plate 247, is a dog 247ᵇ, the upper end of which is adapted to engage with the teeth 252ᵃ of the shifter-frame, or to enter the spaces 252ᵇ and 252ᶜ at the ends of such frame. The dog 247ᵇ is held normally in vertical position, preferably by a coiled spring 247ˢ attached to its lower end and to the back plate 80 of the inclosing casing. The purpose of the plate 247 and of the teeth 252ᵃ of the shifter-frame is to insure that a full stroke of the operating lever 27 shall be made by the voter as he enters and leaves the voting booth; and it is manifest that the dog 247ᵇ will dog the operation of the shifter-frame, except at such times as its upper end is within the spaces 252ᵇ or 252ᶜ. Preferably, a plate spring 255ᵃ (see Fig. 18) that is secured to the shifter-frame has its free end bearing against the link 256, the purpose of this plate being to exert sufficient friction upon the link 256 to hold the link against dropping down when the arm 258 is removed with the door 86. The link 256, being thus frictionally held against dropping, will be in position to receive the pin 257 when the door 86 and parts carried thereby are replaced. The pin 257 freely enters the hole in the end of the link 256, so that the arm 258 may be readily removed with the door 86. Through a slot in the stem 166 of each of the voting keys 160 passes the shorter end 205 of the rocker arm 206 (see Figs. 25, 28 and 29), this arm being mounted in manner free to turn a portion of a revolution, upon the barrel 207 of the rocker sleeve 208 (see Fig. 35) through the square bore 209 of which passes the straight-ticket shaft 210. The rocker arm 206 corresponding to each of the ballot keys that is employed in casting ballots for the various offices, is formed with a segmental cut-away space 211 within which extends the stud 212 projecting from the adjacent end of the rocker sleeve 208, this stud 212 being considerably shorter than the segmental projection 211. To the lower end of each rocker arm 206 is pivotally connected as at 215 the upper end of a spreader link 216 that leads down to interlocking mechanism, the purpose of which is to limit the ballots cast by the voter to the specific number that he is entitled to vote. Inasmuch, however, as the interlocking mechanism forms no part of the subject matter of the present application (being reserved for a separate application for Letters Patent) such interlocking mechanism is not herein shown or described.

By reference more particularly to Figs. 1, 25, 27, 28 and 29 of the drawings it will be seen that the straight ticket shafts 210 are of polygonal outline and are arranged in the lower part of the frames or sections that carry the counter mechanism. In Fig. 1, eight straight ticket shafts are illustrated, seven of these being designed for enabling the voter to vote a straight ticket for any one of seven parties, and the eighth being designed to enable the voter to cast independent ballots for individuals not specifically named upon any of the party tickets. Inasmuch, however, as the mechanism, whereby the voter is enabled to thus cast his ballots for individuals not specifically named upon party tickets, forms no part of the subject matter of the present application, (being reserved as the subject matter of a separate application), the straight ticket shaft shown at the left-hand side of Fig. 1 of the drawings may be disregarded. Each of the straight ticket shafts 210 is shown as passing through the rocker sleeves 208, the reduced portions of which sleeves are journaled in the holes 163ᶠ of the section plates 163. The front end portion of each straight ticket shaft 210 is shown as passing through a hub 270, the reduced ends of which are journaled in the front plates 108 and 109. Each hub 270 is shown as provided with a crank-arm 271 to which are connected certain parts illustrated in Figs. 25, 26 and 27 of the drawings; but as these parts do not relate to the invention designed to be covered by the present application, they will not be specifically described. The outer end of each straight ticket shaft 210 has keyed thereto an operating crank 210ᵃ, the handle of which will be grasped by the voter when he desires to actuate the straight ticket shaft. The rear end of each of the straight ticket shafts 210 passes through a hub 274, the reduced portions of which are journaled in the back plates 92 and 93 of the inclosing casing, and each of these hubs 274 is provided with a crank arm consisting preferably of duplicate bars 275 between which extends a pin 276. The pins 276 at the rear end of the straight ticket shafts extend through a slot 277 (see Figs. 21, 22 and 27) formed in the controlling bar 278 that is mounted between the back plates 92 and 93 of the inclosing casing. As shown, the controlling bar 278 is movably supported by being provided with elongated slots 279 through which pass pins 280 that are fixed in the plates 92 and 93. To the controlling bar 278 is connected, as by a depending arm 281, the inner end of a releasing bar 282, the outer end of which bar passes through the door 51 of the inclosing casing, where it may be grasped by an election judge or other officer authorized to superintend the operation of the machine. The underside of the bar 282 is formed with a shoulder 283 adapted to contact and interlock with a pin 284 that extends between the back plates 92 and 93; but when the bar 282 is lifted so that its shoulder 283 clears the pin 284, the bar 282 can be moved inward in order to shift the controlling bar 278 for a purpose to be presently stated. Projecting laterally from the controlling bar 278 is a stud 286 adapted to engage with the upper end of a bell-crank lever 287 that is pivotally mounted upon a pin 288 extending between the back plates 92 and 93 of the inclosing casing. Preferably the bell-crank lever 287 is arranged in the same vertical plane as the bell-crank lever 242, and, like the lever 242, is preferably bifurcated to straddle the controlling bar 278, which bar also passes between the arms of the bifurcated lever 242. The lower end of the bell-crank lever 287 is provided with an outwardly extending pin 289 that projects through a slot in the plate 92 and is preferably furnished with a friction sleeve that enters a cam slot 290 in a cam plate 291. This cam plate 291 is mounted between the plates 92 and 247 (see Fig. 26) and in the same vertical plane as cam plate 246, the lower cam plate 291 being preferably provided with anti-friction rollers 292 on which the upper cam plate 246 is supported. The plate 247 (see Fig. 19) at the outside of the cam plates 246 and 291 is provided with the lower slots 293 through which extend the studs 294 that project inwardly from the lower portion of the shifter-frame 252 at its inner and outer ends. The studs 251 and 294 at the front end of the shifter-frame 252 are in the same vertical line. The movement of the cam plate 291 will be effected by the operation of the shifter-frame, as will hereafter appear; but it should be noted (see Fig. 20) that the cam plate 291 is considerably shorter than the upper cam plate 246, the purpose of which construction will presently be seen.

From the foregoing description the operation of the parts will be readily understood by those familiar with this class of machines. The voter about to enter the booth finds the front curtain arm 18 lowered, as indicated by dotted lines in Fig. 3, and the operating handle will at such time stand at the left-hand side of the inclosing casing and, hence, in a position opposite that illustrated in Fig. 1 of the drawings. At such time the mechanism within the inclosing casing will be in the position at which it was left by the act of the last preceding voter in shifting the operating lever 27 to the left-hand side of the machine in order to lower the front curtain-rod to enable him to leave the booth. This position of the parts will more fully appear from the subsequent description of the operation, it being sufficient to notice at the moment that, when the preceding voter has left the booth, the actuator shafts have been turned to the position shown in Fig. 21 of the drawings, thus leaving the teeth 176 of the actuator pinions in a position opposite that shown in Fig. 34, i. e., with the teeth 176 at the other side of the vertical center of the units wheel. It will be seen, also, that when the voter thus enters the booth, the shifter-frame 252 and the cam-plates 246 and 291 (see Figs. 18–20) will be in the position opposite that shown in such figures, the cam-plates being in the position illustrated by dotted lines in Fig. 21. Hence, it will be seen that when the voter shifts the operating lever 27 from the left to the right-hand side of the machine, as shown in Fig. 1, the front curtain-rod 18 will be raised by reason of the connections (see Fig. 2) between the operating lever and such rod. This movement of the operating lever to the right-hand side of the inclosing casing will also cause the studs 251 and 294 at the right-hand end of the shifter-frame 252 to successively actuate the cam-plates 246 and 291. The stud 251 will first shift the cam-plate 246, thereby causing the upper inclined wall of the cam-slot 245 to rock the elbow lever 242 about its pivot, and, this rocking of the elbow lever 242, through the medium of the link 241, arm 240 and connecting bar 239, will cause the cranks 237 of all the clutch hubs on the actuator shafts 200 to be turned from the position shown in Fig. 21 to the position shown in Fig. 22 of the drawings. As the clutch hubs 236 are thus shifted, the stud 294 at the right-hand side of the shifter-frame will contact with the right-hand end of the cam-plate 291, moving this plate toward the left and causing the lower inclined wall of the cam-slot 290 to shift the elbow lever 287 from the position shown in Fig. 21 to the position shown in Fig. 22 of the drawings. The judge or inspector of election (or other officer having control of the machine) must then lift the bar 282 off the stud 284, by which it is locked, and will force such bar inward, causing it to shift the controlling bar 278 from the position shown in Fig. 21 to the position shown in Fig. 22 of the drawings, this operation of the controlling bar being necessary before a voter can cast his ballot, since, by reference to Fig. 21, it will be seen that so long as the controlling bar 278 is in the locked position there shown, none of the straight ticket shafts (and consequently none of the keys) can be shifted.

By reference to Fig. 13 it will be seen that the party tickets are arranged in rows above the straight ticket shafts. If the voter desires to vote a straight ticket, as, for example, the straight Democratic ticket, he will grasp the crank handle 210ᵃ of the corresponding straight ticket shaft 210, (this being the 3rd shaft from the left-hand end of the inclosing casing), and will turn this crank handle downward and toward the left. This turning of the straight ticket shaft 210 will cause the lugs or abutments 212 of all the rocker-sleeves 208 on such straight ticket shaft to move one-eighth of a revolution until they abut with the lower shoulder of the segmental space 211 of the rocker-arms 206 through which said shaft passes; and the further movement of the rocker-sleeves 208 incident to this turning of the straight ticket shaft will then cause all the rocker-arms 206 on this shaft (except the rocker-arm of the "amendment" voting mechanism at the back end of the shaft, which need not be here considered) to turn from the position shown, for example, in Fig. 29 to the position shown by one of the rocker-arms at the left-hand side of Fig. 28. This turning of the rocker-arms 206, by the movement of the straight ticket shaft 210, will cause all the ballot keys 160 (except the "amendment" keys) to be depressed to the position shown by one of the keys at the left-hand side of Fig. 28 and in Fig. 25. This turning of the rocker-arms 206 will also cause the interlocking mechanism, to which the links 216 on the rocker-arms 206 are connected, to bring into operation the interlocking mechanism (not herein shown or described) in order to prevent the voter casting ballots for more candidates than those for which he is entitled to vote. The depression of the ballot keys by the straight ticket shaft will shift all the actuators connected with said keys so shifted upon the corresponding actuator shafts 200 until the teeth 176 of all the actuator pinions so moved are brought into vertical alinement with the teeth of the corresponding units wheels 169 in the party group.

It is important to note that by arranging the register wheels side by side in sets and by disposing each set of register wheels so that they shall extend opposite two ballot keys of the same party group, and by disposing the party rows of ballot keys between the actuators, the actuator shafts and the counter-wheels of each party group, an exceedingly compact and effective disposition of the parts is had, thereby materially reducing the space required for the same number of candidates below that necessary in any prior machine.

The depression of the ballot keys as last described will also cause the corresponding indicator plates 182 to be moved until the tongues or projections 186 of these plates expose their lettered portion, (i. e., the letter "X"), below the sight openings in the top plates of the inclosing casing. If the voter, having thus operated one of the straight ticket shafts,—for example, that of the Democratic ticket,—should find that he has done so in error, he may retract his ballot by simply turning the crank handle of such straight ticket shaft from left to right, and, by doing so, he will restore the parts to the position occupied before such straight ticket shaft was moved. This prompt restoration of the parts by the single manipulation of a straight ticket shaft is an important feature over prior constructions in which it has been necessary (where a voter, having cast a straight party ballot, desired to change his ballot) to retract individually all the ballot keys that had been shifted by the movement of the straight ticket shaft.

If a voter desires to vote a "split" ticket, he can do so in either of two ways, viz: first, he can operate the straight ticket shaft of the party ticket containing the greater number of candidates for which he wishes to cast his ballot. After doing this he can retract the individual keys corresponding to those candidates of another party for which he may desire to vote; and, having done this, he can then depress a like number of individual keys in any one or more of the party groups. This depression of the individual keys will shift the corresponding actuator pinions, in manner before described, so as to bring their teeth 176 into line with the teeth of the corresponding units wheels. By my machine also the voter is enabled to cast ballots for candidates not mentioned upon any of the party tickets, and is enabled, indeed, to vote a straight party ticket made up entirely of candidates not appearing upon the top plate of the machine; but the mechanism for accomplishing this is not included in the present application, being specifically reserved as the subject matter of a companion application.

After the voter has cast his ballot in any of the several ways above described, he will shift the operating lever 27 from right to left of the inclosing casing. This shifting of the operating lever 27 will cause the front curtain-rod 18 to swing downward to the position shown by dotted lines in Fig. 3 so as to enable the voter to leave the booth; and the shifting of the operating lever 27 will also cause the voter's ballot to be registered upon the counter-wheels in the following manner, viz: As the operating lever 27 is turned from right to left, it will move the shifter-frame 252 to a position opposite that shown in Fig. 18 of the drawings. This movement of the shifter-frame will cause its studs 251 and 294 to move the cam-plates 246 and 291 to a position opposite that shown in Figs. 19 and 20 of the drawings. It will be seen, however, that the cam-plate 246 is operated in advance of the cam-plate 291, and this results in important advantages that will presently appear. The stud 251 engaging the left-hand end of the cam-plate 246 shifts this cam-plate toward the right, thereby causing the lower inclined wall of the cam-slot 245 to shift the elbow lever 242 and move all the clutch cranks 237 and actuator shafts connected thereto from the position shown in Fig. 22 to the position shown in Fig. 21 of the drawings. This movement of the actuator shafts causes a partial revolution of the actuator pinions 175 sufficient to turn one-tenth of a revolution each units wheel 169 with which an actuator pinion has been brought into engagement position. As this turning of the counter or register wheels is completed, the stud 294 at the left-hand of the shifter-frame 253 strikes the left-hand end of the cam-plate 291, thereby causing the upper inclined wall of its cam-slot 290 to shift the bell-crank lever 287 from the position shown in Fig. 22 to the position shown in Fig. 21. Inasmuch as the upper end of this bell-crank lever 287 engages with the stud 286 on the controlling-bar 278, the controlling-bar and the bar 282 connected therewith will be shifted to the position seen in Fig. 21, when the shoulder 283 of the bar 282 will drop into engagement with the pin 284 beneath it. The bar 282 being thus locked, it will be impossible for any further operation of the machine to be effected until the judge or other officer in charge of the machine releases the bar 282. It will be understood from the foregoing description that this shifting of the controlling-bar 278 from the position shown in Fig. 22 to that shown in Fig. 21 will cause the one or several straight ticket shafts 210, that have been shifted by the voter, to be turned from the shifted position shown in Fig. 22 to that shown in Fig. 21; and, as the straight ticket shafts are thus turned or restored, the rocker-arms 206 mounted thereon will be correspondingly shifted so as to lift the ballot keys to normal position and move the actuator pinions longitudinally so that their teeth shall no longer stand in line with the teeth of the units wheels. When the ballot keys are thus restored to raised position, they will there remain, being counter-balanced by the weight of the links 216 that extend down to the interlocking mechanism.

By reference more particularly to Fig. 29 of the drawings, it will be seen that the segmental slots 211 of the rocker-arms 206 are considerably longer than the abutments 212 of the rocker-sleeves 208, and, by the lost motion thus afforded, it will be seen that the voter may depress any individual ballot key without turning a straight ticket shaft a sufficient distance to cause such shaft to turn the other rocker-arms 206 through which such shaft passes; and, hence, without causing the operation of any other keys controlled by the straight ticket shaft except the one so depressed.

When the judge of election desires to ascertain, after the closing of the polls, the result of the election, he will, by means of a suitable key inserted in the lock 137 (see Figs. 14, 21 and 27) retract the bolt 138. This enables him, by grasping the handle 135 and the bar 129, to move this bar until its projections 133 pass from out the staples 125 that depend from the under side of the outer cover plate 126. He can lift upward the cover plate 126 a slight distance (far enough to clear the extreme upper projections 162 of the counter section plates) and can then slide the outer cover plate 126 until the hooks or brackets 144 (see Fig. 27) are disengaged from the front edge of the inner cover plate 120. The outer cover plate 126 may then be lifted away, thereby exposing through the sight openings 150 the numbers on the subjacent register wheels 169, 170 and 171. It will be observed (see Fig. 14) that the sight openings for the register wheels for each office are grouped together, or a single sight opening might be employed for each set of register wheels. By disposing these sight openings in correspondence with the register wheels upon opposite sides of the rows of keys in each party column, ample space is afforded in the inner cover plate 120 for these sight openings, and, ample space is afforded upon the outer face of the outer cover plate 126 for displaying the names of the different offices and candidates therefor in party groups. For convenience the exposed face of the inner cover plate 120 will have each party row column marked with some identifying letter, (for example, A, B, C, D, E, F and G), and opposite the sight openings of each group of register wheels a designating mark (for example, 1, 2, 3, 4 and 5, etc.) will be placed.

In assembling the machine, the counter-frames, (see Figs. 23, 27, 29 and 33) with the register wheels, actuators, etc. in place therein, are set within the inclosing casing and upon the supporting bars that extend from front to back thereof. When a sufficient number of counter-frames are thus set side by side to complete a party column or group, the actuator shafts 200 will be slipped into position and the straight ticket shafts will also be placed in position. Inasmuch as the actuators 192 are supported by the fixed studs 164 and 193 (see Fig. 29) all the actuators and their pinion hubs will be in true line to receive the actuator shafts, and, inasmuch as the rocker-sleeves 208 of the straight ticket shafts are supported by the side walls of the counter-frames, the bars of these rocker sleeves will also be found to be in accurate alinement to receive the shafts. It will be understood, of course, that in case of any breakage or injury of parts, any one or more of the counter-frames or sections and parts carried thereby can be readily removed and replaced.

Having thus described my invention, what I claim as new and desire to secure by Letters Patent is:

1. In a voting machine, vote registering mechanism, ballot keys therefor, an inclosing casing therefor comprising a cover plate through which the ballot keys project, one or more of the sides of the casing being provided with a flange to overlap said cover plate.

2. In a voting machine, vote registering mechanism, ballot keys therefor, an inclosing casing therefor comprising a removable cover plate through which the ballot keys project and locking mechanism within the casing for retaining said cover plate in position.

3. In a voting machine, vote registering mechanism, an inclosing casing therefor comprising a cover plate in combination with a locking bar within the casing for retaining said cover plate in position, said locking bar being provided with a yielding extension projecting into the path of the mechanism within the casing and arranged to prevent the removal of the cover plate while the voter is within the booth.

4. In a voting machine, vote registering mechanism, an inclosing casing therefor comprising a cover plate provided with projections on its inner side in combination with a movable locking bar within the casing, adjacent said cover plate, and arranged to engage said projections of the cover plate, and a lock having a bolt arranged to engage said locking bar.

5. In a voting machine, vote registering mechanism, ballot keys therefor arranged in several rows, an inclosing casing comprising a cover having a plurality of cut-away spaces for the passage of the several rows of ballot keys therethrough, and provided with a plurality of rows of sight openings on opposite sides of the cut-away spaces through which the rows of ballot keys project.

6. In a voting machine, vote registering mechanism, ballot keys therefor arranged in several rows, an inclosing casing comprising a cover formed of inner and outer plates each provided with several cut-away spaces for the passage therethrough of the several rows of ballot keys, the inner plate being provided with a plurality of rows of sight openings on opposite sides of the cut-away spaces through which the rows of ballot keys project.

7. In a voting machine, vote registering mechanism, an inclosing casing therefor comprising a cover for the vote registering mechanism comprising a cover formed of inner and outer plates, the inner plate having cut-away spaces and the outer plate having projections adapted to pass through said cut-away spaces, in combination with a locking bar movably mounted within the inclosing casing adjacent the inner cover plate, said locking bar having parts adapted to engage with the projections of said outer plate.

8. In a voting machine, vote registering mechanism, ballot keys therefor, an inclosing casing therefor comprising a cover formed of inner and outer plates cut away for the passage of the ballot keys, the inner cover plate being provided with sight openings on opposite sides of the cut-away spaces through which the ballot keys project, and the outer plate having sight openings adjacent the ballot keys through which indicator mechanism may be displayed.

9. In a voting machine, vote registering mechanism comprising a row of ballot keys and an individual counter for each of said keys, the counters for said keys being disposed upon opposite sides of the row of keys.

10. In a voting machine, vote registering mechanism comprising a row of ballot keys, an individual counter for each of said keys, the counters for said keys being disposed upon opposite sides of the row of keys, and suitable actuator mechanism intermediate between the keys and the counters at the opposite sides of the row of keys.

11. In a voting machine, vote registering mechanism comprising a plurality of ballot keys arranged in a row to form a party group, an individual counter for each of said keys, said counters being disposed upon opposite sides of the row of keys, and suitable mechanism between the ballot keys and the counters.

12. In a voting machine, vote registering mechanism comprising a plurality of ballot keys arranged in a row to constitute a party group, individual counters for said keys disposed upon opposite sides of the row of keys, actuator pinions for operating said counters, actuator shafts for turning said pinions and suitable mechanism for rotating said actuator shafts.

13. In a voting machine, vote registering mechanism comprising a plurality of ballot keys arranged in a row to constitute a party group, individual counters for said keys disposed upon opposite sides of the row of keys, actuator pinions for operating said counters, actuator shafts for turning said pinions, the actuators movable longitudinally on said shafts for shifting said pinions into and out of position to engage the counters, and suitable means for turning said actuator shafts.

14. In a voting machine, vote registering mechanism comprising a plurality of counter-sections removably sustained within an inclosing casing, each of said counter sections comprising plural ballot keys arranged in a row, register wheels and actuators carried by said counter sections and arranged upon opposite sides of said row of ballot keys, each of said actuators being suitably connected with its respective ballot key.

15. In a voting machine, vote registering mechanism comprising a plurality of counter sections removably supported within the inclosing casing in juxtaposition to each other, each of said counter sections being provided with register wheels, with actuator mechanism for turning said register wheels, an actuator shaft for said actuator mechanisms and with supports whereby said actuator mechanisms of the several sections are held in alinement to receive the actuator shaft, whereby, when the counter sections are set together within the casing, the actuator shaft may be readily inserted through the several actuator mechanisms.

16. In a voting machine, the combination with an inclosing casing, of interchangeable counter sections removably held therein, each of said counter sections containing plural ballot keys of the same party group and arranged side by side whereby, when the several counter sections comprising each party group are in position, the ballot keys of said group will extend in line.

17. In a voting machine, vote registering mechanism comprising a plurality of counter sections removably held within an inclosing casing, each of said sections containing plural ballot keys of the same party group and arranged side by side, actuator shafts extending through the several counter sections of each party group, and suitable means for operating said actuator shafts.

18. In a voting machine, vote registering mechanism comprising a plurality of counter sections removably held within an inclosing casing, each of said counter sections being provided with a plurality of ballot keys of the same party group and arranged side by side, individual counters operatively connected to each of said ballot keys, said counters being disposed upon opposite sides of the row of keys, actuator shafts extending through said counter sections and removably held therein, and suitable means for turning said actuator shafts.

19. In a voting machine, vote registering mechanism comprising a plurality of counter-sections removably held within an inclosing casing, said counter-sections containing plural ballot keys of the same party group, whereby, when the sections are set together, the ballot keys of said party group will form a row, and a shaft or bar extending through said several counter sections and suitably connected to the individual ballot keys of said sections to shift said keys in unison.

20. In a voting machine, vote registering mechanism comprising a plurality of counter-sections removably held within an inclosing casing, said counter-sections containing plural ballot keys of the same party group, and a straight ticket shaft or bar extending through the party group of counter-sections and suitably connected with the individual keys of said party group, said straight ticket shaft being removable from said counter-sections.

21. In a voting machine, vote registering mechanism comprising a plurality of ballot keys arranged to form a party group, in combination with a shaft whereby all of said keys of said party group may be actuated, rocker sleeves upon said shaft, and rocker arms connecting said rocker sleeves with said ballot keys, said rocker arms being united to said rocker sleeves by a lost motion connection to permit of the independent operation of the individual keys.

22. In a voting machine, vote registering mechanism comprising a row of ballot keys arranged to form a party group, individual counters for said keys disposed upon opposite sides of the row of keys, and movable indicators operatively connected with said keys and disposed at one side of said keys.

23. In a voting machine, vote registering mechanism comprising a row of ballot keys, individual counters for said keys and individual movable indicators operatively connected to said keys to be positively shifted both back and forth thereby out of and into concealment.

24. In a voting machine, vote registering mechanism comprising a row of ballot keys arranged to form a party group, individual counters for each of said keys, said counters being disposed upon opposite sides of the row of keys, and visual indicators for said keys mounted to move transversely to the row of keys and operatively connected to the individual keys each of said indicators being moved positively by its key out of and into concealment.

25. In a voting machine, vote registering mechanism comprising ballot keys, individual counters, and actuating means whereby their movement is determined by the individual keys, and individual visual indicators operatively connected to said keys in manner permitting the indicators to be positively shifted back and forth out of and into concealment, said ballot keys being united to their indicators by lost motion connections to delay the operation of the indicators until after the keys have shifted the actuating mechanism whereby the movement of the counters is determined.

26. In a voting machine, vote registering mechanism comprising ballot keys, individual movable indicators for said keys and a cam actuated connection between each of said keys and its corresponding indicator, said cam actuated connection serving to effect the positive back and forth movement of said indicator.

27. In a voting machine, vote registering mechanism comprising ballot keys, individual movable indicators for said keys provided with cam surfaces, and a part connected with each key and arranged to engage the cam surfaces of its corresponding indicator, whereby said indicator is positively shifted back and forth.

28. In a voting machine, vote registering mechanism comprising ballot keys and individual movable indicators operatively connected to said ballot keys, said indicators comprising a body portion arranged in the plane of the keys and having an angular part provided with a mark or sign to indicate that the ballot key has been actuated.

29. In a voting machine, vote registering mechanism comprising a plurality of ballot keys and movable indicators provided with cam slots, said ballot keys being formed with projections upon their opposite edges to permit either edge of the ballot keys to engage its corresponding indicator.

30. In a voting machine, vote registering mechanism comprising ballot keys arranged to form a party group, in combination with a shaft whereby all of said keys of said party group may be actuated, a plurality of rocker arms mounted upon said shaft, each of said rocker arms being connected at one side of said shaft with its corresponding ballot key and having a part extending from the opposite side of said shaft, and provided with a link, the weight whereof aids in counterbalancing the weight of the ballot key.

31. In a voting machine, vote registering mechanism comprising ballot keys arranged to form a party group, in combination with a shaft whereby all of said keys of said party group may be actuated, rocker sleeves mounted upon said shaft and provided each with a projection, and rocker arms mounted upon said shaft and provided each with shoulders or stops with which the projections of the rocker sleeves will engage to shift said rocker arms and the keys connected therewith.

32. In a voting machine, vote registering mechanism comprising a plurality of ballot keys arranged to form a party group, a plurality of visual indicators arranged to be shifted by said ballot keys, and means extending into position to be operated by the voter, whereby all the ballot keys of a party group and all the corresponding visual indicators may be simultaneously restored to normal position when a voter wishes to retract his ballot.

33. In a voting machine, vote registering mechanism comprising a plurality of ballot keys arranged to form a party group, a counter having a Geneva stop movement actuator for each of said keys, individual register wheels corresponding to said ballot keys, means for operating said actuators to shift the register wheels, and a shaft or bar whereby all of said ballot keys may be operated and restored to normal position and whereby the actuators corresponding to said ballot keys of said party group may be restored to normal position.

34. In a voting machine, vote registering mechanism comprising a plurality of ballot keys, individual counters for said keys, actuator mechanism for determining the movement of said counters, and cam mechanism uniting said individual keys to said actuator mechanism.

35. In a voting machine, vote registering mechanism comprising a plurality of ballot keys, individual counters for said keys, and individual actuators for determining the movement of said counters, each of said keys being provided with cam surfaces for shifting said actuators.

36. In a voting machine, vote registering mechanism comprising a plurality of ballot keys, each provided with a cam slot extending lengthwise thereof, individual counters for said ballot keys and individual actuators for determining the movement of said counters, each of said actuators being provided with a part entering the cam slot of its corresponding ballot key.

37. In a voting machine, vote registering mechanism comprising a ballot key, counter mechanism for said key, and actuating mechanism for determining the movement of said counter mechanism, said actuating mechanism comprising an actuator or part united by a lost motion connection to said key, said lost motion connection serving also to lock the actuator mechanism against movement independently of the key.

38. In a voting machine, vote registering mechanism comprising a plurality of ballot keys, individual counters for said keys, an actuating mechanism for determining the movement of said counters, said actuating mechanism for each counter comprising a longitudinally movable actuator pinion having a tooth arranged to be shifted into and out of the plane of the counter mechanism with which it will engage, and a movable actuator for shifting said actuator pinion, united by a lost motion connection to its corresponding ballot key, whereby the full stroke of the ballot key imparts a relatively slight movement to the actuator pinion.

39. In a voting machine, vote registering mechanism comprising a ballot key, counter mechanism for said key, having a gear wheel, an actuator pinion and shaft, said pinion being longitudinally movable on said shaft and being provided with a tooth to engage said gear wheel, and with a peripheral portion to prevent independent movement of said gear wheel, an actuator secured to said actuator pinion and whereby said pinion may be shifted longitudinally, and a connection between said actuator and the ballot key.

40. In a voting machine, vote registering mechanism comprising a plurality of ballot keys arranged in several rows to form different party groups, a counter having a Geneva stop movement actuator for each of said keys in combination with a plurality of individual straight ticket shafts or devices whereby all the keys of each of said party groups may be actuated and restored to normal position, and suitable connecting means between the several straight ticket shafts or devices for effecting their unison movement to restore the ballot keys to normal position.

41. In a voting machine, vote registering mechanism comprising a plurality of ballot keys arranged in several rows to form different party groups, a counter having a Geneva stop movement actuator for each of said keys in combination with a plurality of individual straight ticket shafts or devices whereby the keys of each of said party groups may be actuated and restored to normal position, and suitable connecting means between the several straight ticket shafts or devices for effecting their unison movement, said connecting means being united to said straight ticket shafts or devices in manner permitting movement of said shafts or devices independent of said connecting means.

42. In a voting machine, vote registering mechanism comprising a plurality of ballot keys arranged in several rows to form different party groups, a counter having a Geneva stop movement actuator for each of said keys in combination with a plurality of individual straight ticket shafts or devices whereby all the keys of each of said party groups may be actuated and restored to normal position, and suitable connecting means between the several straight ticket shafts or devices, said connecting means serving to shift said straight ticket shaft or devices in one direction, and to permit their independent movement in the opposite direction.

43. In a voting machine, vote registering mechanism comprising a plurality of ballot keys arranged in several rows to form different party groups in combination with a plurality of individual straight ticket shafts or devices whereby all the keys of each of said party groups may be actuated and restored to normal position, suitable connecting means between the several straight ticket shafts or devices for effecting their unison movement, and a bar or shifter united to said connecting means and beyond the control of the voter, whereby the movement of said connecting means may be controlled by an authorized attendant.

44. In a voting machine, vote registering mechanism comprising a plurality of ballot keys arranged in several rows to form different party groups, in combination with a plurality of individual straight ticket shafts or devices whereby all the keys of each of said party groups may be actuated and restored to normal position, suitable means connecting the several straight ticket shafts or devices for effecting their unison movement, and means arranged beyond the control of the voter whereby the movement of said straight ticket shafts or devices may be restored to such extent as to allow only for the independent movement of the ballot keys.

45. In a voting machine, vote registering mechanism comprising a plurality of ballot keys arranged in several rows to form different party groups, a counter having a Geneva stop movement actuator for each of said keys in combination with a plurality of individual straight ticket shafts or devices whereby all the keys of each of said party groups may be actuated and restored to normal position, suitable connecting means between the several straight ticket shafts or devices for effecting their unison movement, a bar or shifter for controlling the movement of said connecting means, and means for locking or holding said bar or shifter in position to limit the movement of said straight ticket shafts or devices.

46. In a voting machine, vote registering mechanism comprising a plurality of ballot keys arranged in several rows to form different party groups, a counter having a Geneva stop movement actuator for each of said keys in combination with a plurality of individual straight ticket shafts or devices whereby all the keys of each of said party groups may be actuated and restored to normal position, and a controlling bar uniting said several straight ticket shafts or devices for effecting their unison movement to restore the ballot keys to normal position.

47. In a voting machine, vote registering mechanism comprising a plurality of ballot keys arranged in several rows to form different party groups, a counter having a Geneva stop movement actuator for each of said keys in combination with a plurality of individual straight ticket shafts or devices whereby all the keys of each of said party groups may be actuated and restored to normal position, and a controlling bar uniting said several straight ticket shafts or devices for effecting their unison movement to restore the ballot keys to normal position, said controlling bar being adapted to permit the movement of the straight ticket shafts or devices in one direction, independently thereof.

48. In a voting machine, vote registering mechanism comprising a plurality of ballot keys arranged in several rows to form different party groups, in combination with a plurality of individual straight ticket shafts or devices whereby all the keys of each of said party groups may be actuated and restored to normal position, and a controlling bar uniting said several straight ticket shafts or devices for effecting their unison movement to restore the ballot keys to normal position, said controlling bar being slotted to receive parts connected with said straight ticket shafts or devices.

49. In a voting machine, vote registering mechanism comprising a plurality of ballot keys arranged in several rows to form different party groups, in combination with a plurality of individual straight ticket shafts or devices whereby all the keys of each of said party groups may be actuated and restored to normal position, and a controlling bar uniting said several straight ticket shafts or devices for effecting their unison movement to restore the ballot keys to normal position, and a bar connected to said controlling bar and extending through the wall of the inclosing casing, whereby said controlling bar may be shifted or may be held against movement.

50. In a voting machine, vote registering mechanism comprising a plurality of ballot keys arranged in several rows to form different party groups, a counter having a Geneva stop movement actuator for each of said keys in combination with a plurality of individual straight ticket shafts or devices whereby all the keys of each of said party groups may be actuated and restored to normal position, a controlling bar, and cranks or arms extending between said controlling bar and said individual straight ticket shafts.

51. In a voting machine, vote registering mechanism comprising a plurality of ballot keys forming a party group, a counter having a Geneva stop movement actuator for each of said keys a straight ticket shaft or device whereby all the keys of said group may be actuated and restored to normal position, mechanism for operating the booth curtain or closure, and suitable connections between said operating mechanism and said straight ticket shaft or device whereby, as the voter shifts the curtain or closure to pass from the booth, he will cause said straight ticket shaft or device to restore the ballot keys to normal position.

52. In a voting machine, vote registering mechanism comprising a plurality of ballot keys forming a party group, a counter having a Geneva stop movement actuator for each of said keys a straight ticket shaft or device whereby all the keys of said group may be actuated and restored to normal position, a hand lever for operating the booth curtain or closure, and suitable connections between said hand lever and said straight ticket shaft or device whereby said straight ticket shaft or device may be shifted to restore the ballot keys to normal position.

53. In a voting machine, vote registering mechanism comprising a plurality of ballot keys arranged in several rows to form different party groups, in combination with a plurality of individual straight ticket shafts or devices whereby all the keys of each of said party groups may be actuated and restored to normal position, a controlling bar whereby said straight ticket shafts or devices may be shifted in one direction, an operating lever arranged in position to be shifted by the voter within the booth, and connecting mechanism between said operating lever and said controlling bar comprising a cam arranged to be shifted by said operating lever and serving to determine the time and extent of movement of said controlling bar.

54. In a voting machine, vote registering mechanism comprising a plurality of ballot keys arranged in several rows to form different party groups, in combination with a plurality of individual straight ticket shafts or devices whereby all the keys of each of said party groups may be actuated and restored to normal position, a controlling bar uniting said straight ticket shafts or devices to insure their unison movement, an operating lever arranged to be shifted by the voter within the booth, a shifter-frame connected to said operating lever, a cam plate arranged to be moved by said shifter-frame, and a lever intermediate said cam plate and said controlling bar whereby the movement of the cam plate is imparted to the controlling bar.

55. In a voting machine, vote registering mechanism comprising a plurality of ballot keys arranged to form different party groups, individual counters and counter actuating mechanism for said ballot keys, a plurality of actuator shafts for shifting the counter actuating mechanism, and suitable means connecting said several actuator shafts, comprising clutch mechanism for said actuator shafts, whereby said shafts may be caused to turn in unison, or may be turned independently of each other when the counters are to be reset.

56. In a voting machine, vote registering mechanism comprising a plurality of ballot keys arranged to form different party groups, individual counters and counter actuating mechanism for said ballot keys, a plurality of actuator shafts for shifting the counter actuating mechanism, and suitable means connecting said several actuator shafts, comprising individual clutch mechanism for each of said actuator shafts and a connecting bar united to said individual clutch mechanism for insuring the unison movement of said shafts when connected to said clutch mechanism.

57. In a voting machine, vote registering mechanism comprising a plurality of ballot keys arranged to form different party groups, individual counters and counter actuating mechanism for said ballot keys, a plurality of actuator shafts for shifting the counter actuating mechanism, a bar connecting said actuator shafts to insure their unison movement, an operating lever under the control of the voter within the booth, and connecting mechanism between said operating lever and the bar that unites the actuator shafts, comprising a movable cam whereby the shift of the actuator shafts is controlled.

58. In a voting machine, vote registering mechanism comprising a plurality of ballot keys arranged to form different party groups, individual counters and Geneva stop movement counter actuating mechanism for said ballot keys, a plurality of actuator shafts for shifting the counter actuating mechanism, suitable means connecting said actuator shafts, a plurality of straight ticket shafts connected to the ballot keys, means for effecting the unison movement of said straight ticket shafts, an operating lever and mechanism for imparting movement from said operating lever to said actuator shafts and from said operating lever to said straight ticket shafts, whereby, by one operation, the voter is enabled to turn the actuator shafts and to shift the straight ticket shafts to restore the parts to normal position.

59. In a voting machine, vote registering mechanism comprising a plurality of ballot keys arranged to form different party groups, individual counters and counter actuating mechanism for said ballot keys, a plurality of actuator shafts for shifting the counter actuating mechanism, suitable means connecting said actuator shafts, a plurality of straight ticket shafts connected to the ballot keys, means for effecting the unison movement of said straight ticket shafts, an operating lever and mechanism for imparting movement from said operating lever to said actuator shafts and from said operating lever to said straight ticket shafts, the mechanism between the operating lever and the actuator shafts being arranged to restore said shafts to normal position in advance of the completion of the movement of the mechanism whereby the straight ticket shafts are restored to normal position.

60. In a voting machine, vote registering mechanism comprising a plurality of ballot keys arranged to form different party groups, individual counters and counter actuating mechanism for said ballot keys, a plurality of actuator shafts for shifting the counter actuating mechanism, suitable means connecting said several actuator shafts, a plurality of straight ticket shafts for operating the party groups of ballot keys, a controlling bar for shifting and holding in shifted position said actuator shafts, and mechanism under the control of the voter for restoring the actuator shafts and straight ticket shafts to normal position, said mechanism being so connected with the actuator shafts and with the controlling bar of the straight ticket shafts that the straight ticket shafts retain the ballot keys in locked position until after the actuator shafts have been restored to normal position.

61. In a voting machine, vote registering mechanism comprising a plurality of ballot keys arranged to form different party groups, individual counters and counter actuating mechanism for said ballot keys, a plurality of actuator shafts for shifting the counter actuating mechanism, suitable means connecting said several actuator shafts, comprising clutch mechanism united to said actuator shafts whereby said shafts may be caused to turn in unison, or may be turned independently of each other, and suitable means for retaining all the clutch mechanisms in normal engagement with said shafts.

62. In a voting machine a single axis counter, the wheels of which carry the numerals on the cylindrical surfaces of said wheels, with a Geneva stop movement actuator therefor having direct engagement with the units wheel, said actuator having an oscillating movement to drive the counter, means for producing said oscillating movement, and a movement along the counter to renew its engagement therewith, and a key movable parallel to the planes of the counter wheels and at right angles to the axis of said counter to renew its engagement therewith.

63. A voting machine comprising a single axis register, a Geneva stop actuator mounted on an axis parallel to the axis of the register and movable on said axis into and out of actuating position relatively to said register and a vote indicator movable at right angle to the axes of the register and actuator and operative to move said actuator into and out of actuating position relatively to said register.

64. In a voting machine, the combination of a plurality of single axis counters arranged consecutively in pairs in two parallel rows, keys for said counters arranged in a single row between said rows of counters, said keys moving at right angles to the axes of said counters and the shafts of their actuators, an actuator for each counter and having a four way movement for driving and locking said counter, two oscillating shafts one for each row of counters, each shaft engaging and driving all the actuators of its row of counters, connections between the even numbered keys and their actuators and counters on one side of said row of keys, similar connections between the odd numbered keys and their counters on the other side of said row of keys, said even and odd numbered keys being shaped substantially alike, said connections comprising a pin and cam slot whereby the movement of the key transverse to the actuator shaft causes a movement of its actuator along the actuator shaft.

65. In a voting machine, the combination of a plurality of single axis counters arranged consecutively in pairs in two parallel rows, keys for said counters arranged in a single row between said rows of counters, said keys moving at right angles to the axes of said counters and the shafts of their actuators, an actuator for each counter and having a four way movement for driving and locking said counter, two oscillating shafts one for each row of counters, each shaft being connected to and driving all the actuators of its row of counters, connections between the even numbered keys and their actuators and counters on one side of said row of keys, similar connections between the odd numbered keys and their counters on the other side of said row of keys, said even and odd numbered keys being shaped substantially alike, said connections comprising a pin and cam slot whereby the movement of the key transverse to the actuator shaft causes a movement of its actuator along the actuator shaft.

66. The combination in a voting machine of keys arranged in a party row, counters arranged in a row parallel to said row of keys, the counters of said row being spaced between centers at a distance equal to the distance between centers of alternate keys in said row, an actuator for each of said counters controlled by one of said keys.

67. The combination in a voting machine of keys arranged in a party row, counters arranged in line on both sides of said row of keys, the counters of each of said rows being arranged between centers a distance equal to the distance between centers of alternate keys in said party row.

68. The combination in a voting machine of keys arranged in a party row, counters arranged in line on both sides of said row of keys, the counters of each of said rows being arranged between centers a distance equal to the distance between centers of alternate keys in said party row, each of said counters being connected to one of said keys for operation or control thereby.

JAMES H. DEAN.

Witnesses:
GEORGE P. FISHER, Jr.,
KATHARINE GERLACH.